(12) United States Patent
Sakurai

(10) Patent No.: US 10,572,235 B2
(45) Date of Patent: Feb. 25, 2020

(54) INFORMATION PROCESSING SYSTEM AND CONTROL METHOD

(71) Applicant: CANON KABUSHIKI KAISHA, Tokyo (JP)

(72) Inventor: Yuka Sakurai, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 128 days.

(21) Appl. No.: 15/702,926

(22) Filed: Sep. 13, 2017

(65) Prior Publication Data
US 2018/0074807 A1    Mar. 15, 2018

(30) Foreign Application Priority Data
Sep. 14, 2016 (JP) .................... 2016-179327

(51) Int. Cl.
*G06F 8/61* (2018.01)
*G06F 21/45* (2013.01)
*H04N 1/00* (2006.01)

(52) U.S. Cl.
CPC ............ *G06F 8/62* (2013.01); *G06F 21/45* (2013.01); *H04N 1/00204* (2013.01); *H04N 1/00344* (2013.01); *H04N 2201/0094* (2013.01)

(58) Field of Classification Search
CPC .... G06F 8/60–70; G06F 21/45; G06F 21/608; G06F 2221/2143; G06F 2221/2151; H04W 4/50; H04L 63/123; H04L 63/168; H04N 1/00204; H04N 1/00344; H04N 2201/0094

USPC .................................................. 717/171–178
See application file for complete search history.

(56) References Cited

U.S. PATENT DOCUMENTS

| 6,529,784 | B1 | 3/2003 | Cantos et al. | |
| 8,510,755 | B2* | 8/2013 | Paramasivam | G06F 11/0757 714/13 |
| 8,949,962 | B2* | 2/2015 | Kim | H04L 67/34 726/7 |
| 9,071,958 | B2* | 6/2015 | Mullins | H04W 8/20 |
| 2006/0277301 | A1* | 12/2006 | Takanashi | G06F 21/78 709/225 |

(Continued)

OTHER PUBLICATIONS

Mobach, D. G. A., et al., Managing agent life cycles in open distributed systems, Proceedings of the 2003 ACM symposium on Applied computing, Mar. 9-12, 2003, pp. 61-65. [retrieved on Sep. 19, 2019], Retrieved from the Internet.*

*Primary Examiner* — Geoffrey R St Leger
(74) *Attorney, Agent, or Firm* — Carter, DeLuca & Farrell LLP

(57) ABSTRACT

An information processing system including an apparatus management server and an apparatus management agent in which an agent application controlling communication with the apparatus management server is installed is provided. The apparatus management agent sends an uninstall check request of the agent application when there is an authentication error in communication with the apparatus management server. The apparatus management server sends a deletion code if the apparatus management agent which has sent the uninstall check request is registered as a target for uninstalling the agent application. Moreover, the apparatus management agent uninstalls the agent application if the deletion code is received.

7 Claims, 19 Drawing Sheets

(56) References Cited

U.S. PATENT DOCUMENTS

| | | | |
|---|---|---|---|
| 2010/0325642 A1* | 12/2010 | Paramasivam | G06F 11/0757 |
| | | | 719/317 |
| 2012/0311722 A1* | 12/2012 | Wang | H04L 63/0428 |
| | | | 726/28 |
| 2015/0079965 A1* | 3/2015 | Mullins | H04W 12/08 |
| | | | 455/419 |
| 2015/0100686 A1 | 4/2015 | Sakurai | |
| 2015/0154215 A1* | 6/2015 | Batchu | G06F 21/60 |
| | | | 726/26 |

* cited by examiner

FIG. 9

| Tenant ID ~901 | Customer name ~902 | Assessment end date and time ~903 | Tenant creation date and time ~904 | Last operation date and time ~905 | Administrator name ~906 | Administrator mail address ~907 |
|---|---|---|---|---|---|---|
| 0001AA | AA commercial corporation | 2016/3/3 | 2016/3/1 | 2016/5/23 13:54 | AAOOko | xxxxx@ggg.com |
| 0002AA | BB corporation | | 2015/12/4 | 2016/7/3 10:54 | BBOOko | yyyy@ggg.com |
| 0003BB | CC company | | 2015/10/14 | 2016/7/15 8:54 | CCOOo | zzzzz@ggg.com |

FIG. 10

| Tenant ID | Agent ID | Device ID | IP address |
|---|---|---|---|
| 0001AA | Client10 | Device1 | 172.24.111.112 |
| 0001AA | Client11 | Device11 | 192.11.21.11 |
| 0001AA | Client11 | Device12 | 192.11.21.12 |

| Tenant ID | Agent ID | Device ID | IP address |
|---|---|---|---|
| 0003BB | Client30 | Device31 | 152.24.65.12 |

| Tenant ID | Agent ID | Authentication key | Status | Stop date and time |
|---|---|---|---|---|
| 0001AA | Client10 | xxxxx | Stopped state | 2016/7/6 |
| 0001AA | Client11 | yyyyy | Restarting (Data while stopped is sent) | |

| Tenant ID | Agent ID | Authentication key | Status | Stop date and time |
|---|---|---|---|---|
| 0003BB | Client30 | odkvh | Running | |

| Tenant ID | Device ID | Job type | Start time | End time | Number of pages | Document name |
|---|---|---|---|---|---|---|
| 0001AA | Device1 | Copy | 2016/05/08 14:25 | 2016/05/08 14:40 | 4 | |
| 0001AA | Device11 | Print | 2016/05/09 13:40 | 2016/05/09 13:42 | 1 | a.doc |
| 0001AA | Device11 | Copy | 2016/05/09 15:03 | 2016/05/09 15:12 | 5 | |
| 0001AA | Device12 | Copy | 2016/05/10 10:03 | 2016/05/10 10:10 | 2 | |

| Tenant ID 1301 | Agent ID 1302 | Authentication key 1303 | Tenant deletion date and time 1304 |
|---|---|---|---|
| 0002AA | Client20 | zzzzz | 2016/7/3 |
| 0002AA | Client21 | zaxsr | 2016/7/3 |
| 0002AA | Client22 | furmg | 2016/7/3 |

INFORMATION PROCESSING SYSTEM AND CONTROL METHOD

BACKGROUND OF THE INVENTION

Field of the Invention

The present invention relates to an information processing system and a control method.

Description of the Related Art

Apparatus management services for registering and managing apparatuses such as peripheral apparatuses and printers and providing services have been proposed. Apparatus management services include forms of use in which service providers (apparatus management service providers) manage apparatuses of a plurality of customers (individuals and companies). In such apparatus management services, a data region is secured for each customer, and an apparatus is registered and managed for each customer.

Systems in which servers for apparatus management services are placed in the customer's environments on the Internet have been proposed. In such systems, apparatus management agents serving as client apparatuses in which agent applications are installed are placed in the client network environments or apparatus management agent functions are mounted in apparatuses so that relaying is performed between apparatus management servers and apparatuses. The specification of U.S. Pat. No. 6,529,784 discloses a method for reducing redundant management of resources of a plurality of subscribers by concentrating resources used to manage resources of the subscribers on a single server.

Examples of a form in which an apparatus management service is used include a service contract used to manage an apparatus using charging and an assessment contract used to provide a service for free. In the assessment contract, an agent application is installed in a client apparatus of a potential customer, information of the apparatus is collected for a certain period, the collected information is reported, and conclusion of a contract of the service is made. However, since there are also are potential customers who are customers with which conclusion of the contract may not be able to be made, stopping and deleting the agent application may be forgotten in some cases differently from the service contract using charging. In this case, a neglected agent application keeps communicating uselessly with the apparatus management server.

SUMMARY OF THE INVENTION

The present invention provides an information processing system in which an agent application installed in a client apparatus is automatically deleted.

An information processing system according to an embodiment of the present invention is an information processing system that includes a management system and a client apparatus in which an agent application controlling communication with the management system is installed, wherein the client apparatus comprises a first memory storing instructions and a first processor which is capable of executing the instructions in the first memory causing the client apparatus to: send an uninstall check request for the agent application if there is an authentication error in communication with the management system; and uninstall the agent application if a deletion code is received from the management system, wherein the management system comprises a second memory storing instructions and a second processor which is capable of executing the instructions in the second memory causing the management system to: manage an agent ID; and send the deletion code if the client apparatus which has sent the uninstall check request is registered as a target for uninstalling the agent application.

Further features of the present invention will become apparent from the following description of exemplary embodiments with reference to the attached drawings.

BRIEF DESCRIPTION OF THE DRAWINGS

FIG. 9 is a diagram illustrating an example of data stored in a customer management table.

FIG. 10 is a diagram illustrating an example of data stored in an apparatus management table.

FIG. 11 is a diagram illustrating an example of data stored in an agent management table.

FIG. 12 is a diagram illustrating an example of data stored in a job history information table.

DESCRIPTION OF THE EMBODIMENTS (First Embodiment)

Figure 1:
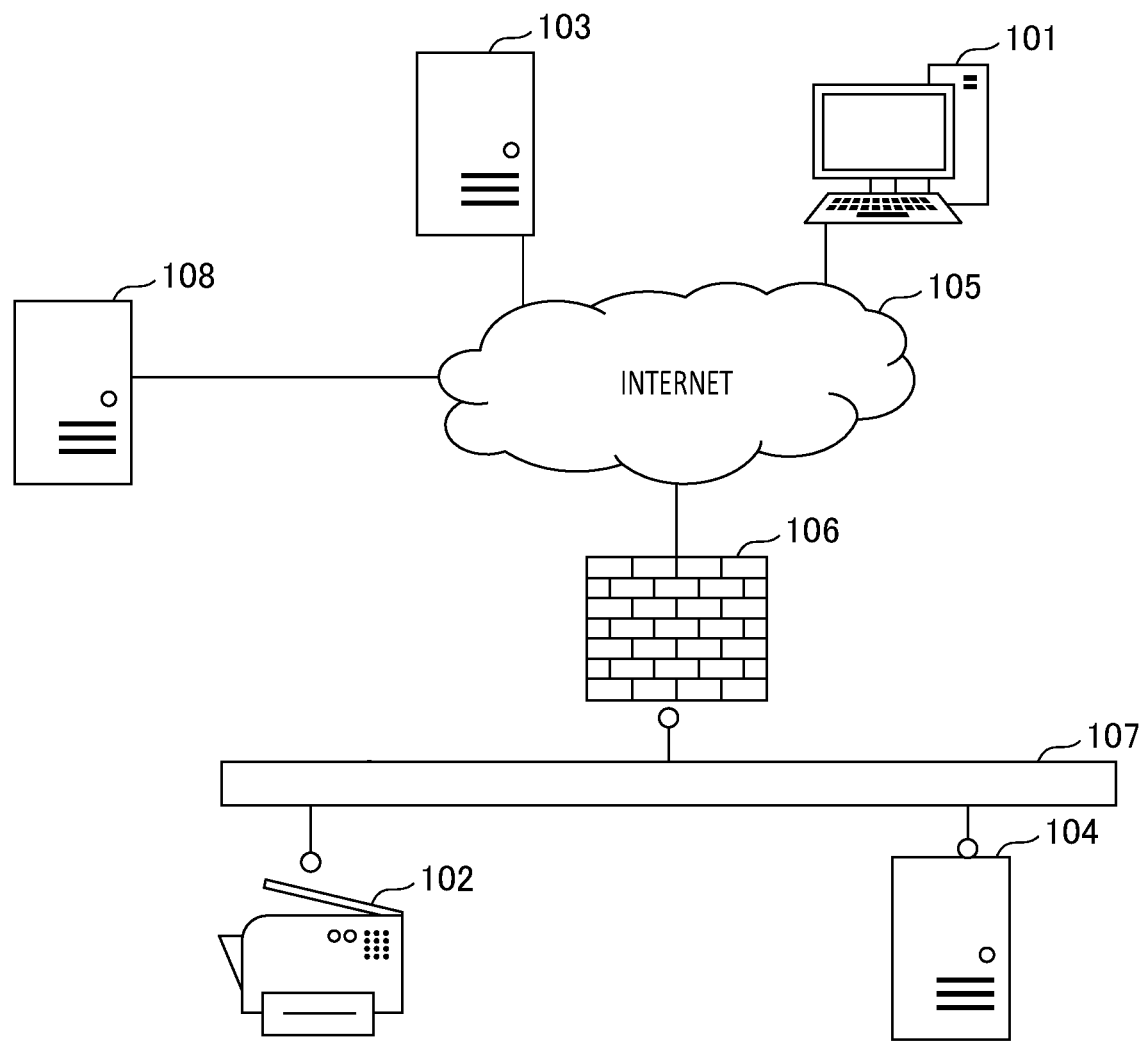
FIG. 1 is a diagram showing an overall configuration of an information processing system according to an embodiment.

FIG. 1 is a diagram showing an overall configuration of an information processing system according to an embodiment.

The information processing system shown in FIG. 1 includes a management terminal 101, a peripheral apparatus 102, an apparatus management server 103, an apparatus management agent 104, and an external system 108. A network 105 is a network using a known technique such as the Internet. The management terminal 101 is a personal computer or the like operated by a service provider user. The management terminal 101 is connected to the network 105. A client network 107 and a firewall 106 are also present between the management terminal 101 and the network 105 in some cases.

The apparatus management server 103 distinguishes each of a plurality of clients and each tenant and manages the peripheral apparatus 102. The apparatus management server 103 is made public over the network 105 and can communicate with the management terminal 101, the peripheral apparatus 102, the apparatus management agent 104, and the external system 108. Although only one apparatus management server 103 is illustrated in FIG. 1, the apparatus management server 103 functions as an apparatus management server system serving as a management system including a management server, a storage server, and the like on the Internet.

The peripheral apparatus 102 is a network apparatus which can communicate with a host computer (not shown) and the apparatus management agent 104. The peripheral apparatus 102 is a multifunction machine or a printer which receives print data from a host computer over the client network 107, for example, and performs printing on paper using a known printing technique such as an electrophotographic technique and an inkjet technique. Furthermore, the peripheral apparatus 102 may be, for example, a multifunction machine with a function of scanning and copying a paper manuscript with a scanner or converting a paper manuscript into image data and sending the converted image data using an e-mail or the like.

The apparatus management agent 104 is a client apparatus in which an agent application is installed. The agent application controls communication with the apparatus management server 103. Furthermore, the agent application performs communication with the peripheral apparatus 102 instead of the apparatus management server 103, collects information such as a job log from the peripheral apparatus 102, and controls the peripheral apparatus 102. The apparatus management agent 104 is installed in a base network including one or more peripheral apparatuses 102. The peripheral apparatus 102 and the apparatus management agent 104 are connected to the client network 107 such as a local area network (LAN). Moreover, the peripheral apparatus 102 and the apparatus management agent 104 are connected to the network 105 via the firewall 106. For this reason, communication originating from the management terminal 101 and the apparatus management server 103 connected to the network 105 is rejected using the firewall 106. However, communication to the peripheral apparatus 102 and the apparatus management agent 104 cannot be performed using communication originating from the management terminal 101 and the apparatus management server 103.

In a network system in the embodiment, the service provider user operates the management terminal 101 to access the apparatus management server 103 and registers and manages the peripheral apparatus 102 which is managed for each client. Moreover, the management terminal 101 refers to information on the peripheral apparatus 102 which is managed for each client. Furthermore, the management terminal 101 instructs the peripheral apparatus 102 to execute a control command. The apparatus management agent 104 regularly performs communication on the apparatus management server 103, checks whether the execution of the control command has been instructed, and receives the instruction if the instruction is provided. The apparatus management agent 104 collects information on the peripheral apparatus 102 using a simple network management protocol (SNMP) or the like when the control command is executed or changes operation settings of the peripheral apparatus 102.

Figure 2:
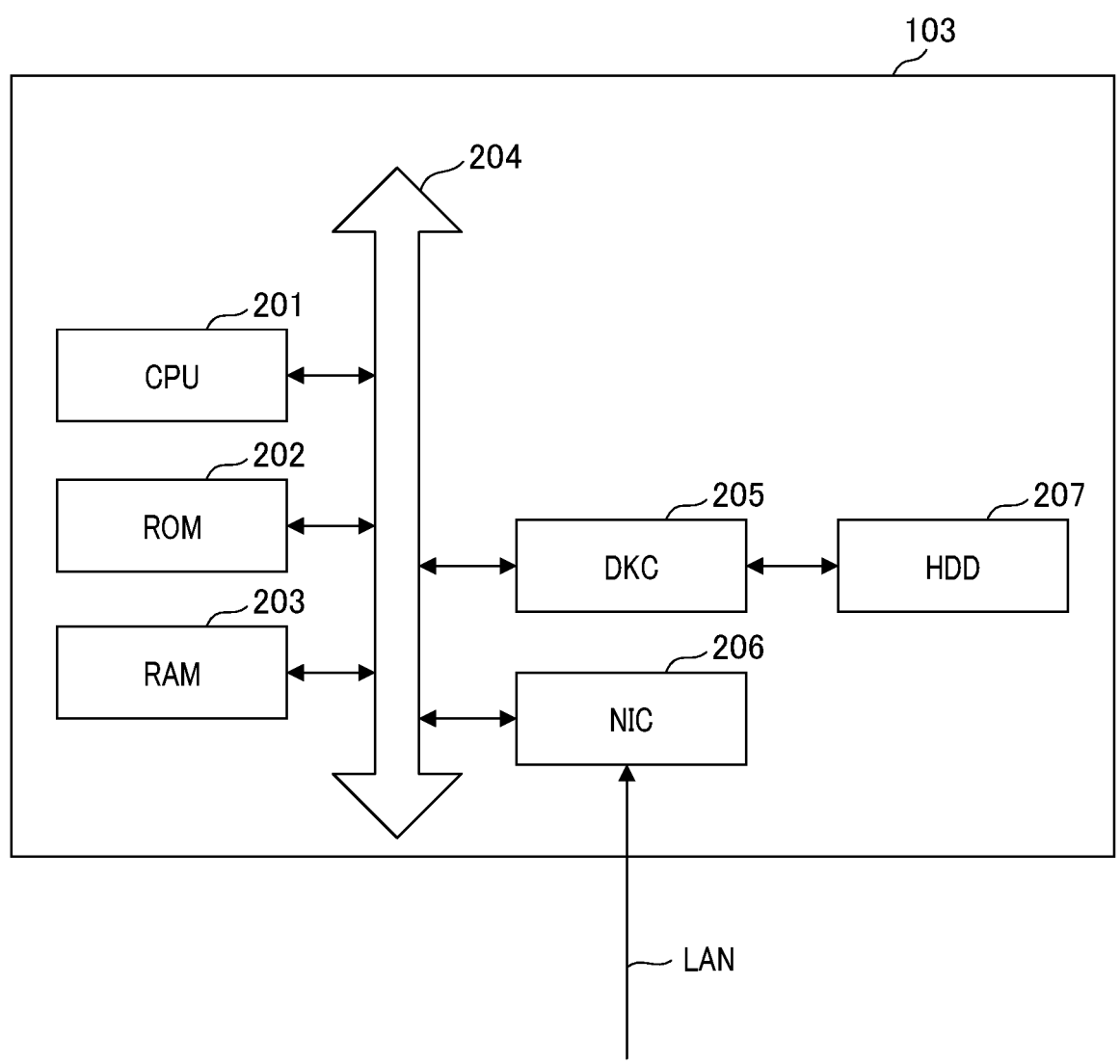
FIG. 2 is a diagram illustrating an example of a hardware configuration of an apparatus management server.

FIG. 2 is a diagram illustrating an example of a hardware configuration of an apparatus management server.

FIG. 2 illustrates an apparatus management server serving as a single apparatus, but an apparatus management server may be realized in a cloud. In other words, an apparatus management server may be realized by operating an application in a virtual machine.

The apparatus management server 103 includes a central processing unit (CPU) 201, a read only memory (ROM) 202, and a random access memory (RAM) 203. Furthermore, the apparatus management server 103 includes a disk controller (DKC) 205, a network interface card (NIC) 206, and a hard disk drive (HDD) 207.

The CPU 201 realizes processes described in examples by executing software stored in the ROM 202 or the HDD 207 serving as a large-scale storage apparatus. A software program serving as an operating subject in all descriptions which will be described below is stored in the HDD 207. The CPU 201 generally controls apparatuses connected to a system bus 204. The RAM 203 functions as a main memory, a work area, and the like of the CPU 201. The DKC 205 controls the HDD 207. The NIC 206 exchanges data bi-directionally with other information processing apparatuses over the network 105. A firewall (not shown) may be installed between the NIC 206 and the network 105.

Figure 3:
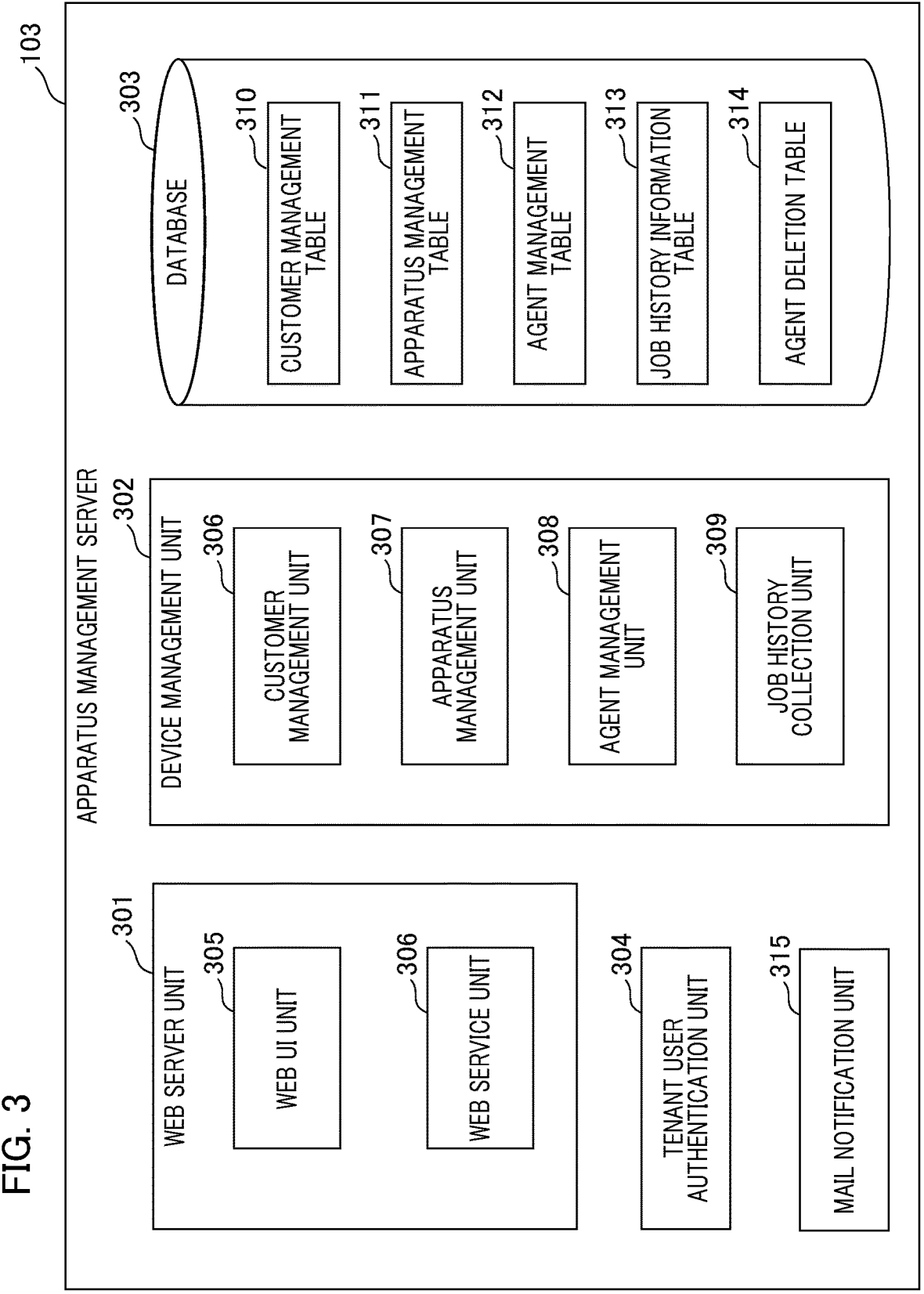
FIG. 3 is a block diagram illustrating an example of a software configuration of the apparatus management server.

FIG. 3 is a block diagram illustrating an example of a software configuration of the apparatus management server.

The apparatus management server 103 includes a web server unit 301, a device management unit 302, a database 303, a tenant user authentication unit 304, and a mail notification unit 315. The web server unit 301 provides a service by receiving a hypertext transfer protocol (HTTP) or a hypertext transfer protocol secure (HTTPS) request from the management terminal 101, the peripheral apparatus 102, and the external system 108 over the NIC 206 and the network 105 and sending responses.

The web server unit 301 includes a web user interface (UI) unit 305 and a web service unit 306. The web UI unit 305 receives a HTTP request from a web browser 701 in the management terminal 101 and cooperates with the tenant user authentication unit 304. The web UI unit 305 sends hypertext mark-up language (HTML) data to the web browser 701 when the tenant user authentication unit 304 performs authentication on a user and the user is successfully authenticated. The web service unit 306 receives a web service request such as a simple object access protocol (SOAP) and a representational state transfer (REST) from the apparatus management agent 104 and the external system 108 and sends responses such as XML data.

The tenant user authentication unit 304 determines access by an unauthenticated user and returns an HTML of a login screen when no authentication token is set for an HTTP request from the web browser 701. The web browser 701 displays the login screen and sends the authentication information to the apparatus management server 103 if authentication information such as a user ID, a password, and the like is input. The tenant user authentication unit 304 receives the authentication information and determines that the user is successfully authenticated if a combination of the user ID and the password is correct, an authentication token is issued and is set for a cookie or the like, and the web browser 701 is instructed to be redirected to a requested screen. When the redirecting is performed, the web UI unit 305 produces an HTML of the requested screen and sends a reply to the web browser 701.

The device management unit 302 includes a customer management unit 306, an apparatus management unit 307, an agent management unit 308, and a job history collection unit 309. The customer management unit 306 manages customers registered in the apparatus management server 103. Furthermore, the customer management unit 306 controls a registration and deletion process of the customers. In the case of a customer who performs an assessment contract, the customer management unit 306 sets a time limit of the assessment contract when the customer is registered.

The apparatus management unit 307 manages information on the peripheral apparatus 102 registered for each customer. The agent management unit 308 controls a registration/stop/deletion process of the apparatus management agent 104 performed on the apparatus management server 103. Furthermore, when the web service unit 306 receives a request from the apparatus management agent 104, an authentication process of the apparatus management agent 104 is performed.

The job history collection unit 309 receives job history information from the apparatus management agent 104 via the web service unit 306. The job history collection unit 309 acquires a tenant ID, an agent ID, and signature information added into an HTTP header unit of an HTTP request when receiving the job history information and delivers them to the agent management unit 308. The agent management unit 308 acquires an authentication key 1103 associated with the acquired tenant ID and agent ID from an agent management table 312 which will be described below with reference to FIG. 11 and creates signature information of an HTTP message. When the created signature information coincides with signature information acquired using an HTTP header, the agent management unit 308 performs authentication as a request from a correct agent. After that, the agent management unit 308 transfers the HTTP message to the job history collection unit 309. The job history collection unit 309 acquires job history information from the transferred HTTP message and stores the job history information in a job history information table 313.

The mail notification unit 315 sends a mail to an administrator mail address 907 managed using a customer management table 310 according to a schedule. The database 303 includes the customer management table 310, an apparatus management table 311, the agent management table 312, the job history information table 313, and an agent deletion table 314. Information managed by the tables will be described below.

Figure 4:
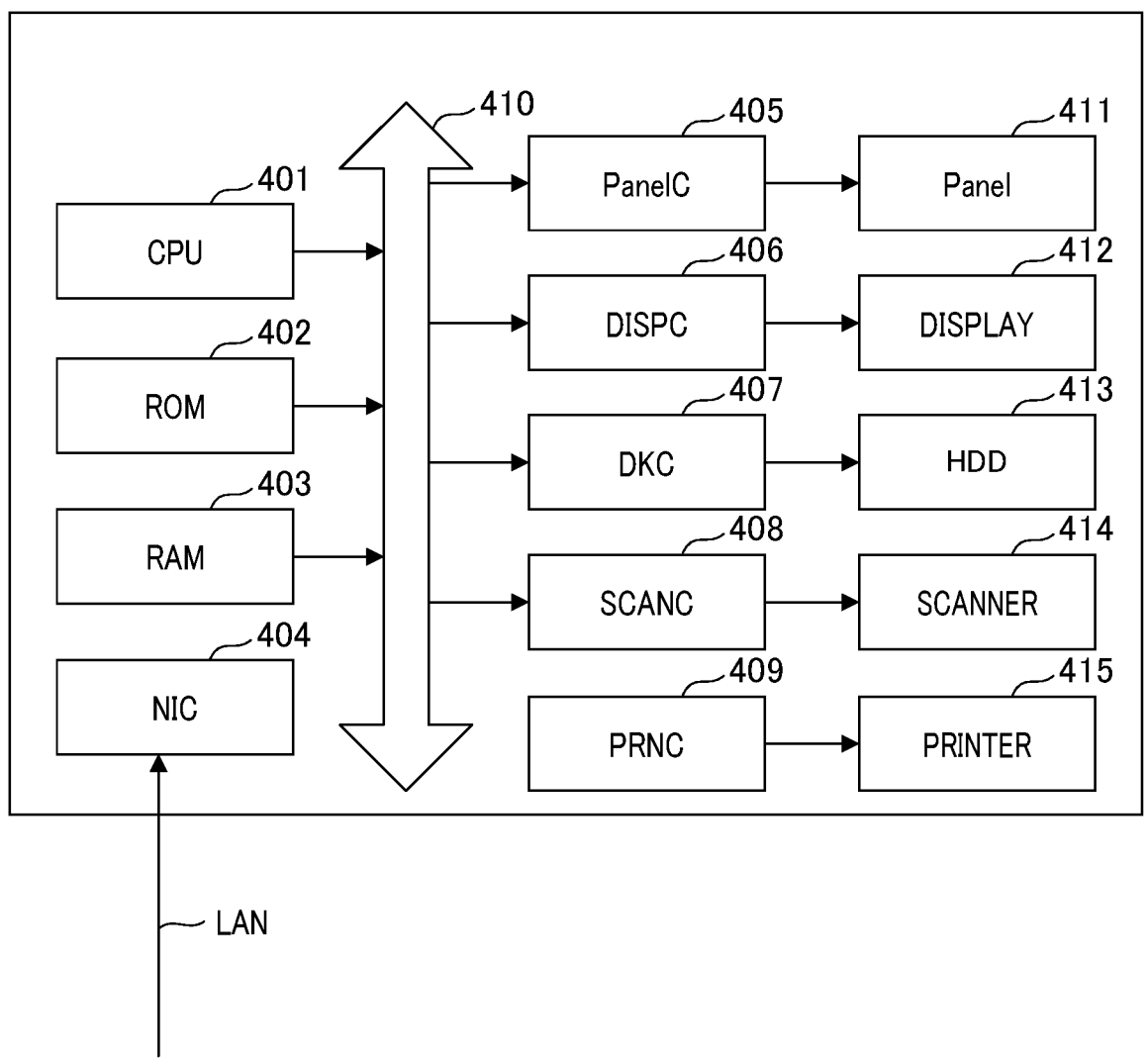
FIG. 4 is a diagram showing a hardware configuration of a peripheral apparatus.

FIG. 4 is a diagram showing a hardware configuration of a peripheral apparatus.

In FIG. 4, as examples of the peripheral apparatus 102, multifunction machines are assumed to include a printing function, a scan function, a network communication function, and the like. The CPU 401 executes software stored in the ROM 402 or the HDD 413 serving as the large-scale storage apparatus and generally controls apparatuses connected to a system bus 410. The RAM 203 functions as a main memory, a work area, or the like of the CPU 401.

A panel controller (Panel C) 405 controls an instruction input from an operation panel (Panel) 411 included in the peripheral apparatus 102. A display controller (DISPC) 406 controls display of a display module (DISPLAY) 412 constituted of, for example, a liquid crystal display and the like.

The DKC 407 controls the HDD 413 serving as a mass storage apparatus. The NIC 404 exchanges data with another information processing apparatus over the network 105. A scanner controller (SCANC) 408 controls an optical scanner 414 included in the peripheral apparatus 102 and scans a paper manuscript. A printer controller (PRNC) 409 controls a printer 415 included in the peripheral apparatus 102 and performs printing on paper using a known printing technique such as an electrophotographic technique and an inkjet technique.

Figure 5:
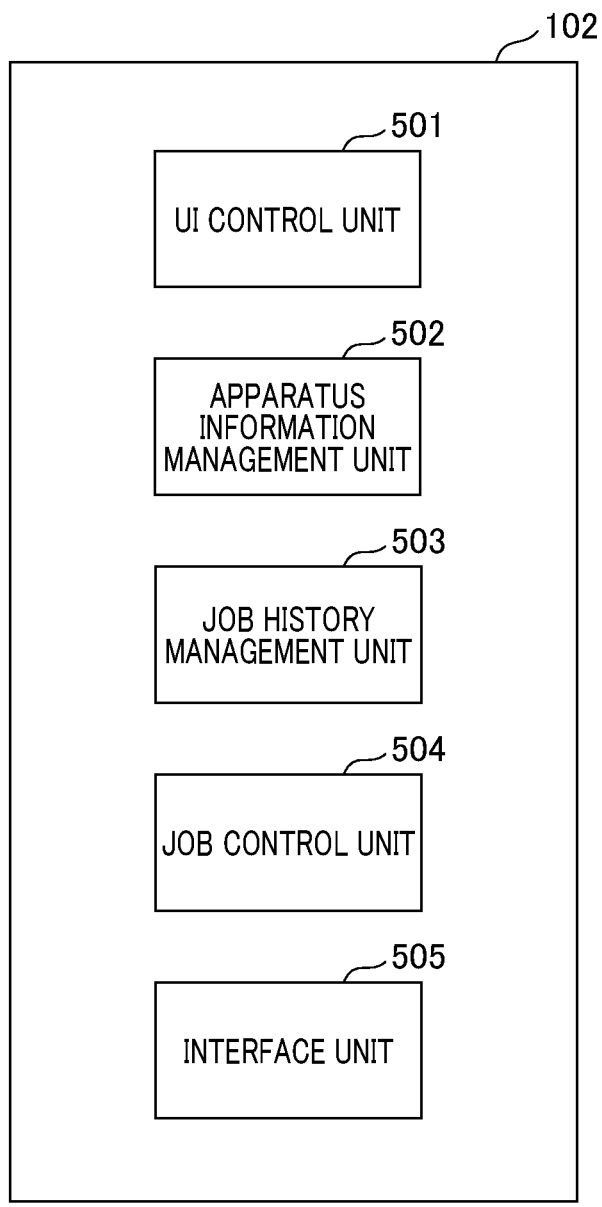
FIG. 5 is a diagram illustrating an example of a software configuration of the peripheral apparatus.

FIG. 5 is a diagram illustrating an example of a software configuration of the peripheral apparatus.

The peripheral apparatus 102 includes an interface unit 505, an UT control unit 501, an apparatus information management unit 502, a job history management unit 503, and a job control unit 504. The interface unit 505 is connected to the network 105 and receives a print job from a host computer (not shown). Furthermore, the interface unit 505 communicates with the apparatus management agent 104.

The UI control unit 501 controls the display module 412 with the display controller (DISPC) 406 and displays a screen for the purpose of receiving a copy instruction. Furthermore, the UI control unit 501 controls the operation panel 411 with the panel controller 405, receives a user's copy instruction to the peripheral apparatus 102, and produces a copy job.

The job control unit 504 receives a print job received by the interface unit 505 and a copy job produced by the UI control unit 501 and executes the jobs. The job control unit 504 controls the printer controller 409 and the scanner controller 408 in accordance with the details of the jobs and executes each of the jobs. The job control unit 504 stores job details and execution results in the job history management unit 503 as a history when execution of a job has been started or completed. The apparatus information management unit 502 manages setting information and configuration information of the peripheral apparatus 102 and sends designated information as a reply. Examples of information managed by the apparatus information management unit 502 include a serial number.

Figure 6:
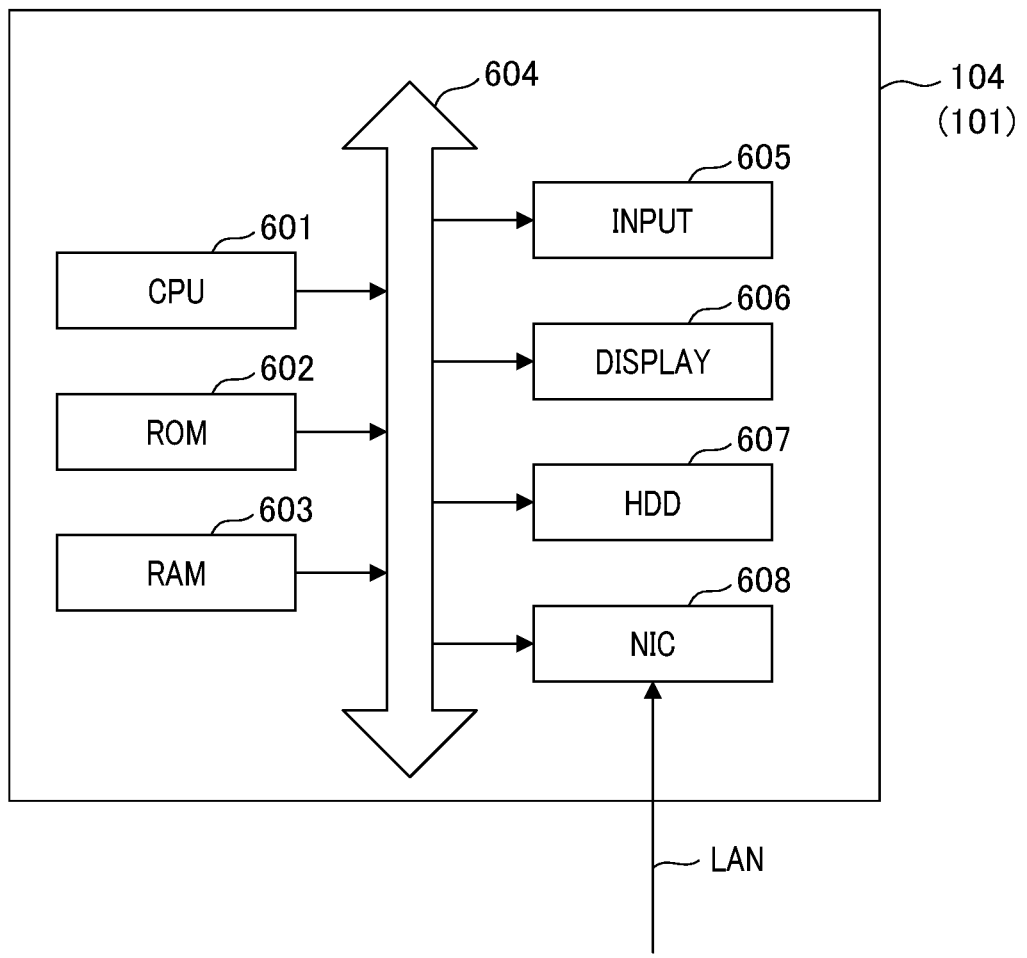
FIG. 6 is a diagram illustrating an example of a hardware configuration of an apparatus management agent and a management terminal.

FIG. 6 is a diagram illustrating an example of a hardware configuration of an apparatus management agent and a management terminal.

A CPU 601 executes software stored in a ROM 602 or an HDD 607 serving as a large-scale storage apparatus to realize processes described in examples. The CPU 601 generally controls apparatuses connected to a system bus 604. ARAM 603 functions as a main memory, a work area, and the like of the CPU 601. An input apparatus (INPUT) 605 is a keyboard, a mouse, a touch panel, a button, or the like and functions as an input means of a user operation. A display module (DISPLAY) 606 is a display module constituted of a liquid crystal display or the like. An NIC 608 exchanges data bi-directionally with other nodes over the network 105.

Figure 7:
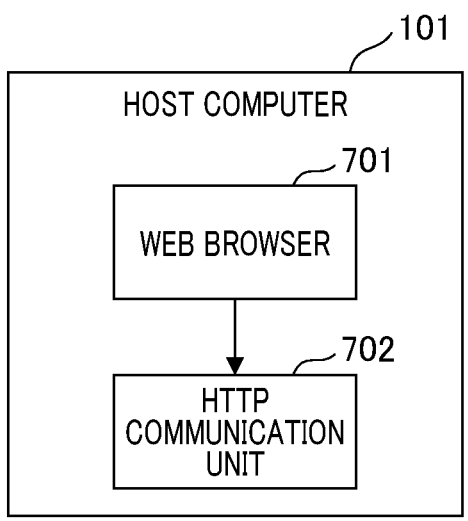
FIG. 7 is a diagram illustrating an example of a software configuration of the management terminal.

FIG. 7 is a diagram illustrating an example of a software configuration of the management terminal.

The management terminal 101 includes a web browser 701 and an HTTP communication unit 702. The web browser 701 designates a uniform resource locator (URL) to the HTTP communication unit 702, sends an information acquisition request, and acquires HTML data. The web browser 701 interprets the HTML data acquired using the HTTP communication unit 702 and performs screen drawing on the display module 606. Furthermore, the web browser 701 receives a user operation performed on control in the displayed screen from the input apparatus 605 and sends a request to the HTTP communication unit 702 in accordance with details of an operation.

The HTTP communication unit 702 receives a communication request from the web browser 701, communicates with a web server using an HTTP or HTTPS protocol via an image processing apparatus or the like and the NIC 608, and performs a request for a web page, reception of web page data, and the like. The service provider user can designate an URL of the apparatus management server 103 in the web browser 701 in the management terminal 101 and access the web server unit 301 to use a function of the apparatus management server 103.

Figure 8:
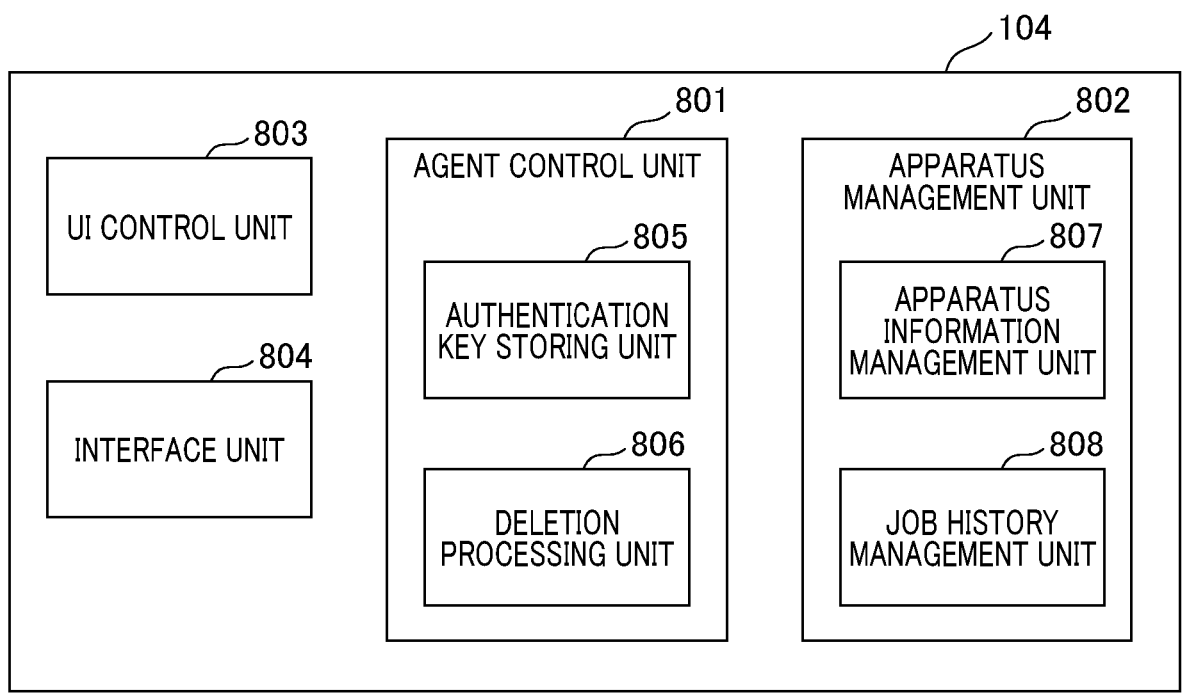
FIG. 8 is a diagram illustrating an example of a software configuration of the apparatus management agent.

FIG. 8 is a diagram illustrating an example of a software configuration of the apparatus management agent.

The apparatus management agent 104 includes an agent control unit 801, a UI control unit 803, an interface unit 804, and an apparatus management unit 802. The interface unit 804 communicates with the peripheral apparatus 102 and the apparatus management server 103 using the NIC 608 over the network 105. The UI control unit 803 controls the input apparatus 605 and the display module 606 such that a screen is displayed and receives a user operation performed on control the displayed screen from the input apparatus 605. Moreover, the UI control unit 803 delivers a user instruction to the agent control unit 801 and the apparatus management unit 802 in accordance with the operation content. Furthermore, the UI control unit 803 displays processed results on the display module 606 to display the results with respect to the service provider user.

The agent control unit 801 controls registration and deletion of the apparatus management agent 104 performed on the apparatus management server 103. The agent control unit 801 includes an authentication key storing unit 805 and a deletion processing unit 806. The authentication key storing unit 805 stores an authentication key used at the time of communicating with the apparatus management server 103 and a tenant ID for deletion. The deletion processing unit 806 performs uninstalling on the apparatus management agent 104.

The UI control unit 803 notifies the agent control unit 801 that the user has provided an agent registration and an uninstalling instruction to the apparatus management server 103. The apparatus management unit 802 acquires a list of the peripheral apparatuses 102 to be managed by the agent from the apparatus management server 103 via the interface unit 804. An apparatus information management unit 807 collects information from the peripheral apparatus 102, which is acquired and is a target to be managed, via the interface unit 804 and sends the information to the apparatus management server 103. A job history management unit 808 acquires job history information managed by the job history management unit 503 in the peripheral apparatus 102 and sends the job history information to the apparatus management server 103.

FIG. 9 is a diagram illustrating an example of data stored in a customer management table included in the apparatus management server.

The customer management table 310 is a table used to manage the customers registered in the apparatus management server 103. Customer information including at least contract information is stored in the customer management table 310. A tenant ID 901 is a unique ID used to identify a tenant of a customer managed by the system. A customer name 902 is a name of a customer used when the customer is displayed in the web browser 501 or the like in the management terminal 101. An assessment end date and time 903 is an end date of an assessment period when an assessment contract has been made.

A tenant creation date and time 904 is a date and time at which the customer has been created in the system. The customers can be created by the service provider user using the web browser 501 in the management terminal 101 or be created by the web service unit 306 which receives a web service request from the external system 108.

A last operation date and time 905 is a last date and time at which an access to data of the customer has been performed. For example, a date and time at which a login using a user operation has been successfully performed from the login screen using the web browser 501 in the management terminal 101 and a date and time at which the web service unit 306 has received web service requests from the external system 108 may be set for the last operation date and time 905.

An administrator name 906 is a name of an information technology (IT) administrator used when the IT administrator of the customer is displayed in the web browser 501 or the like in the management terminal 101. The administrator mail address 907 is a mail address of the IT administrator who sends a mail when the apparatus management agent 104 is automatically stopped.

FIG. 10 is a diagram illustrating an example of data stored in an apparatus management table included in the apparatus management server.

The apparatus management table 311 is a table used to manage the peripheral apparatus 102 registered for each customer in the apparatus management server 103. A tenant ID 1001 is an ID used to identify a tenant (a customer) and is associated with the tenant ID 901 managed using the customer management table 310. An agent ID 1002 is a unique ID used to identify the apparatus management agent 104. An device ID 1003 is a unique ID used to identify the peripheral apparatus 102. It can be seen from the apparatus management table 311 shown in FIG. 10 that the apparatus management agent 104 identified using the agent ID 1002 manages the peripheral apparatus 102 identified using the device ID 1003.

An information provider (IP) address 1004 is a network address used to communicate with the peripheral apparatus 102. The network addresses indicated by the IP address 1004 are used when the apparatus management agent 104 communicates with the peripheral apparatus 102. Note that the apparatus management server 103 performs management using separate tables with the same structure for each customer ID when the apparatus management tables 311 are separate and managed for each customer.

FIG. 11 is a diagram illustrating an example of data stored in an agent management table included in the apparatus management server.

The agent management table 312 is a table used to manage the agent registered for each customer in the apparatus management server 103. Agent management information associated with the apparatus management agent 104 is stored in the agent management table 312. In the agent management table 312, different authentication information for each agent apparatus is associated and managed for each tenant. A tenant ID 1101 is an ID used to identify a tenant (a customer) and is associated with the tenant ID 901 managed using the customer management table 310. An agent ID 1102 is a unique ID used to identify the apparatus management agent 104. The authentication key 1103 is a signature key used to authenticate an agent managed by the apparatus management server 103.

A status 1104 is a status of the apparatus management agent 104. For example, any of a stop standby, a stopped state, running, restarting (in which data while stopped is sent), and restarting (in which data while stopped is not sent) is set for the status 1104. A stop standby is set when communication of the apparatus management agent 104 has been stopped using the apparatus management server 103, and the status 1104 is updated to a stopped state when a stop code is returned as a response to an HTTP request from the apparatus management agent 104.

The apparatus management agent 104 stops partial communication with the apparatus management server 103 when receiving a stop code. For example, the apparatus management agent 104 stops sending job history information to the apparatus management server 103. The stop code is associated with communication only between the apparatus management server 103 and the apparatus management agent 104 and does not affect communication between the apparatus management agent 104 and peripheral apparatus.

Restarting is set for the status 1104 when communication between the apparatus management server 103 and the apparatus management agent 104 is restarted. When a restarting code is returned as a response of an HTTP request from the apparatus management agent 104, the status 1104 is updated to running. At the time of restarting, the apparatus management agent 104 can selectively send job history information collected from the peripheral apparatus 102 in a stopped state to the apparatus management server 103 or send only job history information after the restarting to the management server.

The service provider user may restart the communication of the apparatus management agent 104 with a screen displayed in the web UI unit 305 in accordance with an access from a web browser in the management terminal 101. Furthermore, the web service unit 306 may restart the communication of the apparatus management agent 104 in accordance with an HTTP request from an external system. A stop date and time 1105 is a stop date and time at which communication between the apparatus management agent 104 and the apparatus management server 103 has been partially stopped.

FIG. 12 is a diagram illustrating an example of data stored in a job history information table included in the apparatus management server.

The job history information table 313 is a table used to manage history information of jobs executed by the peripheral apparatus 102. A tenant ID 1201 is an ID used to identify a tenant (a customer). An device ID 1202 is an ID used to identify the peripheral apparatus 102. A job type 1203 indicates a type of job in the peripheral apparatus 102. For example, printing which is printing from the host computer, copying, scanning, faxing, box printing for printing a document stored in the peripheral apparatus 102, and the like may be set for the job type 1203.

A start time 1204 indicates a time at which a process of a job starts. An end time 1205 indicates a time at which the process of a job ends. A number of pages 1206 indicates the number of pages processed using the job. A document name 1207 indicates a document name set for a job using a print application of the job. Note that the job history information table 313 held in the job control unit 504 in the peripheral apparatus 102 has a structure obtained by excluding the tenant ID 1201 and the device ID 1202 from the table shown in FIG. 12. The job history information table 313 held in the job history management unit 808 in the apparatus management agent 104 has a structure obtained by excluding the tenant ID 1201 for the table structure shown in FIG. 12.

Figures 13, 14:
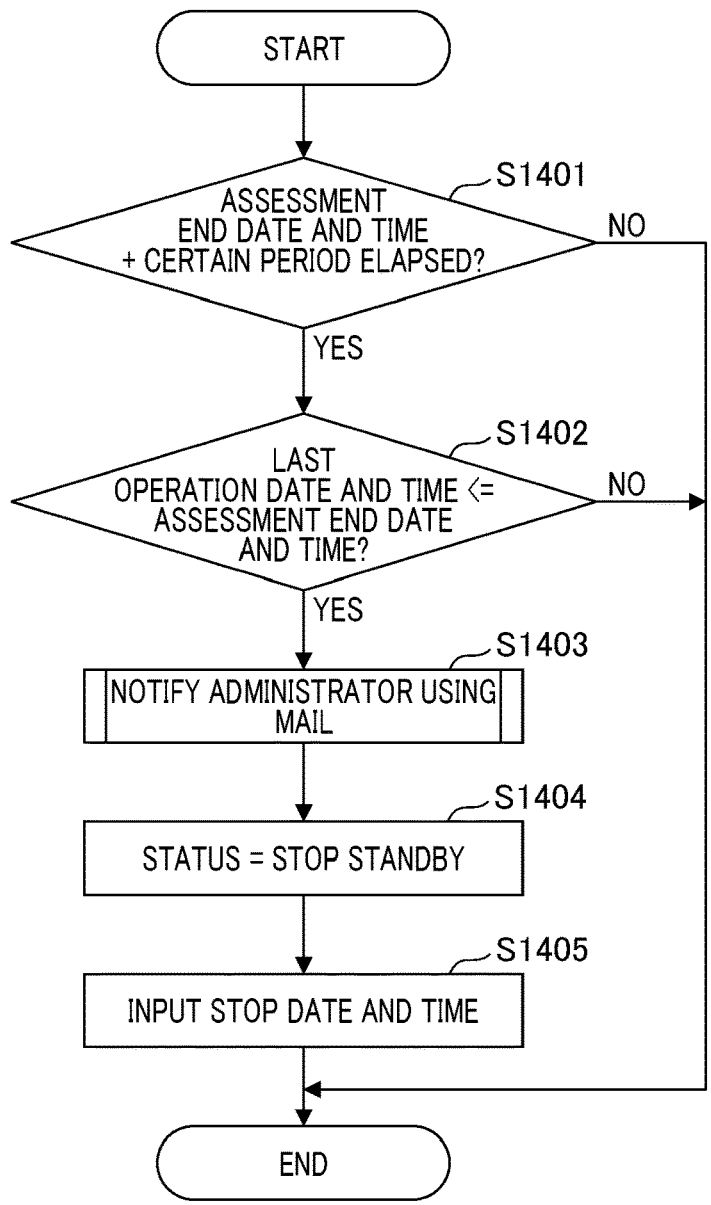
FIG. 13 is a diagram illustrating an example of data stored in an agent deletion table.
FIG. 14 is a flowchart for describing an example of a process of stopping an apparatus management agent.

FIG. 13 is a diagram illustrating an example of data stored in an agent deletion table included in the apparatus management server.

The agent deletion table 314 is a table used to manage the apparatus management agent 104 that is a target for uninstalling the agent application. Information to be deleted which is information associated with the apparatus management agent 104 that is a target for uninstalling is stored in the agent deletion table 314. A tenant ID 1301 is an ID used to identify a tenant (a customer). An agent ID 1302 is a unique ID used to identify the apparatus management agent 104. An authentication key 1303 is a signature key used to authenticate the agent managed by the apparatus management server 103. A tenant deletion date and time 1304 is a date and time at which a tenant managed by the apparatus management server 103 has been deleted.

The web UI unit 305 acquires a deletion instruction from the service provider user from the web browser 701 in the management terminal 101 or receives the web service request from an external system using the web service unit 306 so that the tenant (the customer) can be deleted. When the tenant is deleted, the apparatus management server 303 stores the tenant ID 1101, the agent ID 1102 of the apparatus management agent 104 associated with the tenant, the authentication key 1103, and a date and time at which the tenant is deleted in the agent deletion table 314. Moreover, the apparatus management server 303 deletes data in the tables associated with the tenant.

FIG. 14 is a flowchart for describing an example of a process of stopping an apparatus management agent using the apparatus management server.

Step processes in the flowchart shown in FIG. 14 are realized by reading and executing, by the CPU 201 provided in the apparatus management server 103, a control program stored in a nonvolatile storage means such as the ROM 202 and the HDD 207. Only processes associated with the present invention will be described with reference to this flowchart, and a description of other processes will be omitted because the other processes are different from the essence of the present invention.

In Step S1401, the customer management unit 306 checks whether a certain period of time has elapsed from an assessment end date and time 903. When it is determined that a certain period of time has elapsed from the assessment end date and time 903, the process thereof proceeds to a process of Step S1402. Subsequently, in Step S1402, the customer management unit 306 checks whether the last operation date and time 905 is before the assessment end date and time 903. The last operation date and time 905 which is before the assessment end date and time 903 refers to a tenant which is not used after the assessment. Therefore, when it is determined that the last operation date and time 905 is before the assessment end date and time 903, the process proceeds to a process of Step S1403.

In Step S1403, the mail notification unit 315 notifies the administrator mail address 907 in the tenant that an operation of the apparatus management agent 104 in the tenant is to be stopped. Thus, when no access to the apparatus management server 103 is performed after a contract period indicated by customer information has been completed, an administrator apparatus can be notified of this.

In Step S1404, the agent management unit 308 sets the status 1104 to a stop standby. Moreover, in Step S1405, the agent management unit 308 inputs the stop date and time 1105.

Figure 15:
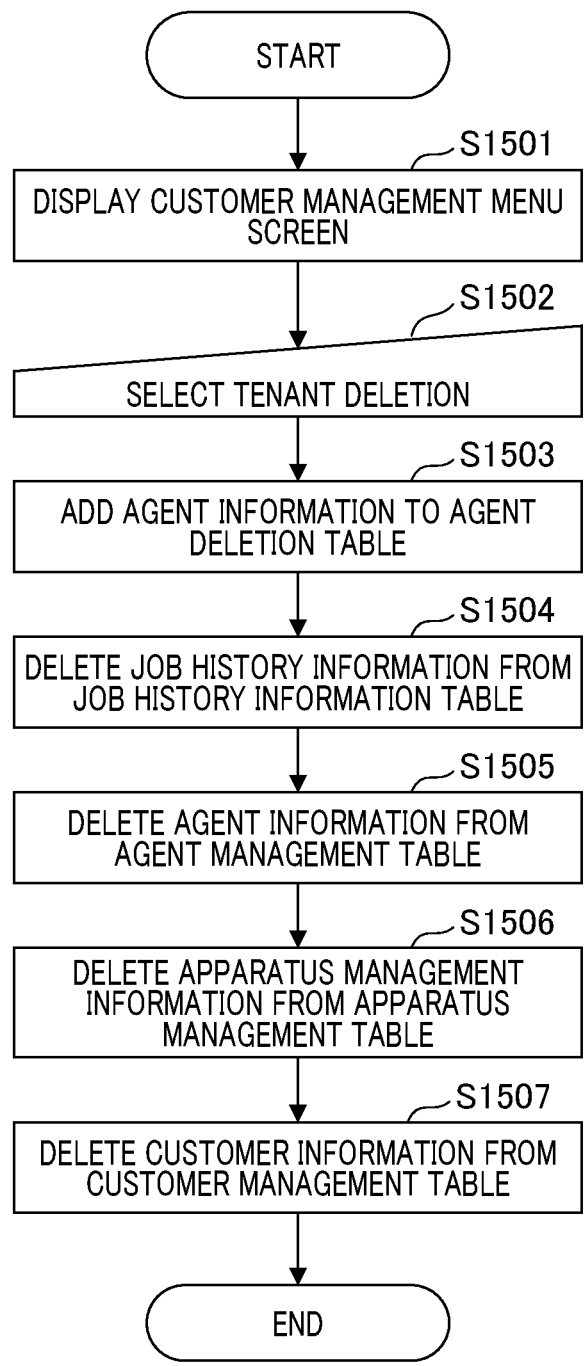
FIG. 15 is a flowchart for describing a process of deleting a tenant.

FIG. 15 is a flowchart for describing an operation process in which the apparatus management server deletes a tenant.

Step processes in the flowchart shown in FIG. 15 are realized by reading and executing, by the CPU 201 provided in the apparatus management server 103, the control program stored in the nonvolatile storage means such as the ROM 202 and the HDD 207. Only processes associated with the present invention will be described with reference to this flowchart, and a description of other processes will be omitted because the other processes are different from the essence of the present invention.

In Step S1501, the web UI unit 305 displays a customer management menu screen in the web browser 501 in the management terminal 101. Subsequently, in Step S1502, the Web browser 501 selects tenant deletion in accordance with a service provider user's operation. With such selection, a deletion request for the tenant is received.

Subsequently, in Step S1503, the customer management unit 306 receives the tenant deletion operation selected in Step S1502 and adds the agent information associated with a selected tenant ID to be deleted to the agent deletion table 314. To be specific, the customer management unit 306 retrieves agent information using the tenant ID to be deleted from the agent management table 312 and adds both of the agent ID 1102 associated with a tenant ID to be deleted and the authentication key 1103. When a plurality of agent IDs are associated with one tenant ID, the customer management unit 306 adds a plurality of pieces of agent information to the agent deletion table 314. Furthermore, the customer management unit 306 adds a date and time at which tenant deletion has been received.

Subsequently, in Step S1504, the customer management unit 306 deletes job history information associated with a tenant ID to be deleted from the job history information table 313. Subsequently, in Step S1505, the customer management unit 306 deletes agent information associated with a tenant ID to be deleted from the agent management table 312.

Subsequently, in Step S1506, the customer management unit 306 deletes apparatus management information associated with a tenant ID to be deleted from the apparatus management table 311. Subsequently, in Step S1507, the customer management unit 306 deletes customer information associated with a tenant ID to be deleted from the customer management table 310. Although a case in which a tenant is deleted from the management terminal 101 in accordance with the service provider user's operation in this flowchart, deletion of the tenant may be selected in accordance with an HTTP request from an external system.

Figure 16:
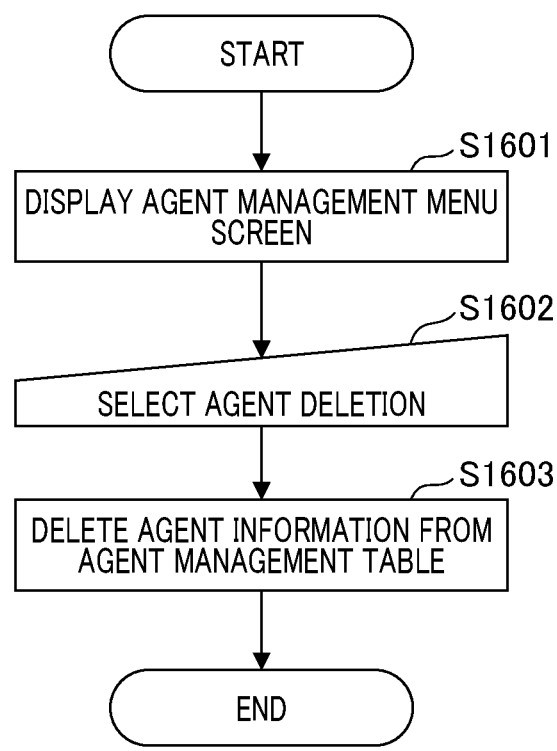
FIG. 16 is a flowchart for describing a process of deleting an agent.

FIG. 16 is a flowchart for describing an example of an operation process when the apparatus management server deletes an agent.

Step processes in the flowchart shown in FIG. 16 are realized by reading and executing, by the CPU 201 provided in the apparatus management server 103, the control program stored in the nonvolatile storage means such as the ROM 202 and the HDD 207. Only processes associated with the present invention will be described with reference to this flowchart, and a description of other processes will be omitted because the other processes are different from the essence of the present invention.

In Step S1601, the web UI unit 305 displays an agent management menu screen in the Web browser 501 in the management terminal 101. Subsequently, in Step S1602, the web browser 501 selects agent deletion in accordance with a service provider user's operation.

Subsequently, in Step S1603, the customer management unit 306 deletes agent information associated with an agent ID to be deleted from the agent management table 312. Note that, although a case in which an agent is deleted from the management terminal 101 in accordance with the service provider user's operation in this flowchart, deletion of the agent may be selected in accordance with an HTTP request from the external system 108.

Figure 17:
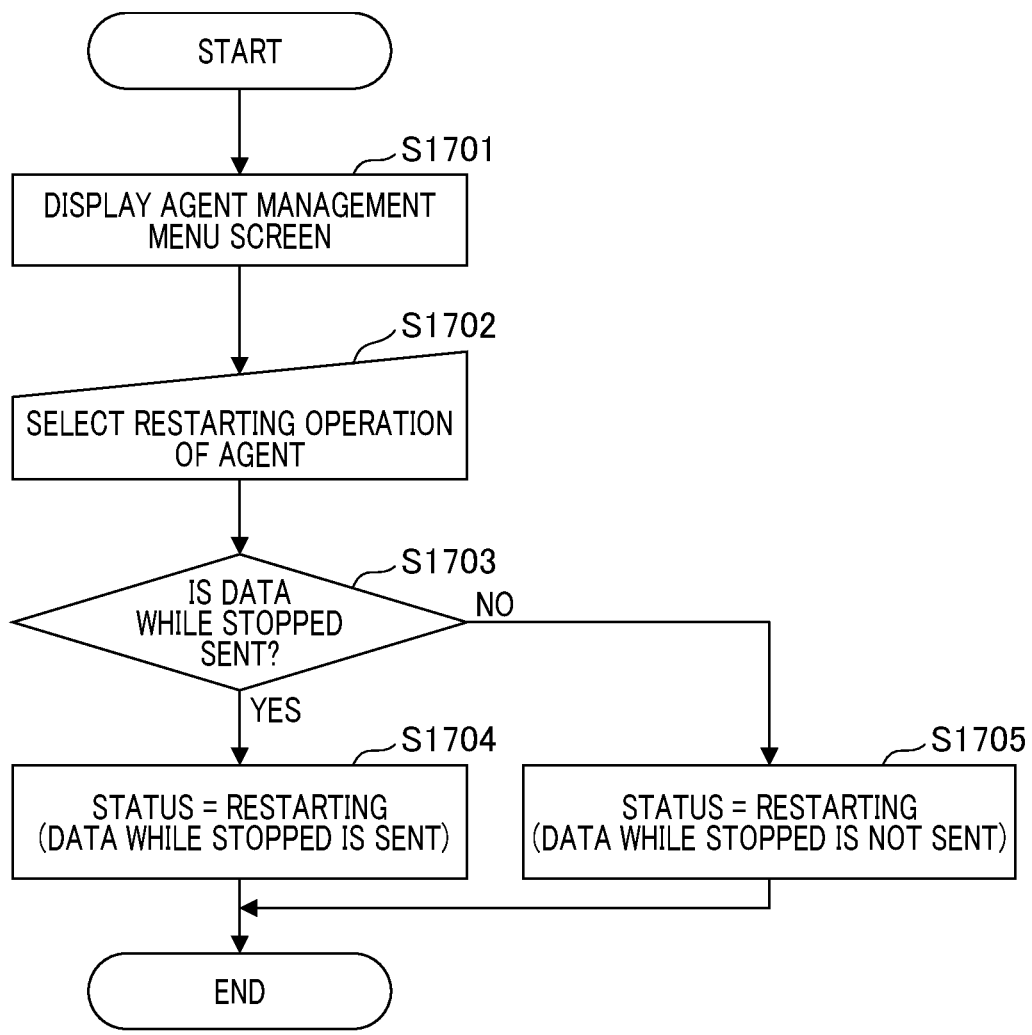
FIG. 17 is a flowchart for describing a process of restarting an operation of an agent.

FIG. 17 is a flowchart for describing an example of an operation process when the apparatus management server restarts an operation of an agent.

Step processes in the flowchart shown in FIG. 17 are realized by reading and executing, by the CPU 201 provided in the apparatus management server 103, the control program stored in the nonvolatile storage means such as the ROM 202 and the HDD 207. Only processes associated with the present invention will be described with reference to this flowchart, and a description of other processes will be omitted because the other processes are different from the essence of the present invention.

In Step S1701, the web UI unit 305 displays an agent management menu screen in the web browser 501 in the management terminal 101. Subsequently, in Step S1702, the web browser 501 selects a restarting operation of an agent in accordance with a service provider user's operation. The user can further select a setting in which "data wile stopped is sent" and a setting in which "data while stopped is not sent" when selecting the restarting operation of the agent. The setting in which "data while stopped is sent" is a setting in which the apparatus management agent 104 sends data while stopped (for example, job history information) at the time of restarting operation. The setting in which "data while stopped is not sent" is a setting in which the apparatus management agent 104 does not send the data while stopped at the time of restarting operation.

Subsequently, in Step S1703, the agent management unit 308 determines whether the setting in which "data while stopped is sent" has been made in Step S1202. When it is determined that the setting in which "data while stopped is sent" has been made, the process proceeds to a process of Step S1704. When it is not determined that the setting in which "data while stopped is not sent" has been made, the process proceeds to a process of Step S1705.

In Step S1704, the agent management unit 308 changes the status 1104 in the agent management table 312 to restart (to send data while stopped). Furthermore, in Step S1705, the agent management unit 308 changes the status 1104 in the agent management table 312 to restart (not to send data while stopped).

Figure 18:
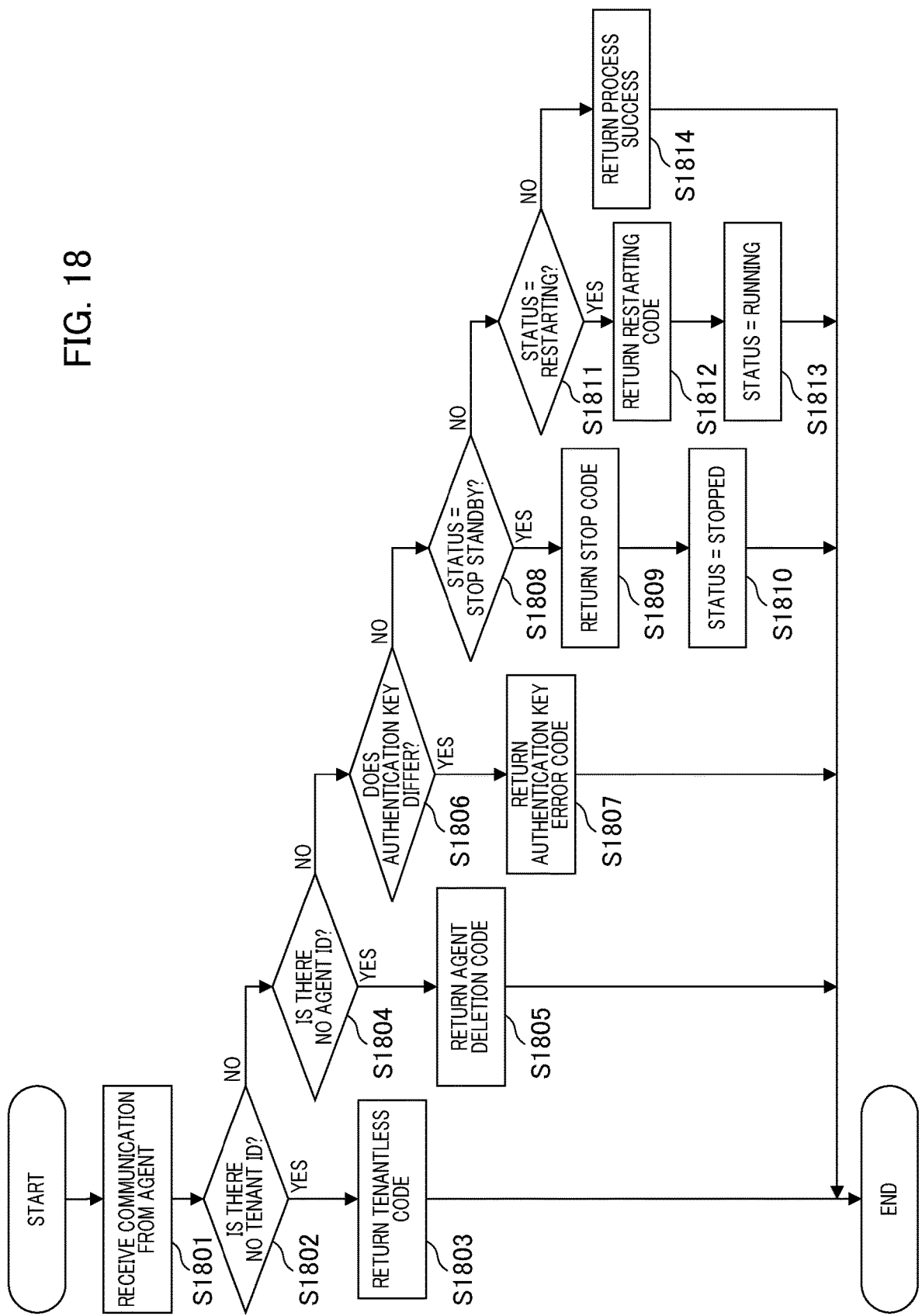
FIG. 18 is a flowchart for describing an operation process when communication of an agent is received.

FIG. 18 is a flowchart for describing an example of an operation process when the apparatus management server receives a communication request of an apparatus management agent.

Step processes in the flowchart shown in FIG. 18 are realized by reading and executing, by the CPU 201 provided in the apparatus management server 103, the control program stored in the nonvolatile storage means such as the ROM 202 and the HDD 207. Only processes associated with the present invention will be described with reference to this flowchart, and a description of other processes will be omitted because the other processes are different from the essence of the present invention.

In Step S1801, the agent management unit 308 receives an HTTP request sent from the apparatus management agent 104 and performs an agent authentication process using information of the HTTP message and HTTP header. First, the agent management unit 308 acquires a tenant ID, an agent ID, and signature information from the HTTP header.

In Step S1802, the agent management unit 308 checks whether the agent management table 312 of the customer designated using the tenant ID acquired in Step S1801 is present. When it is determined that the agent management table 312 of the customer designated using the tenant ID acquired by Step S1801 is present, the process proceeds to a process of Step S1804. When it is not determined that the agent management table 312 of the customer designated using the tenant ID acquired by Step S1801 is present, the process proceeds to a process of Step S1803.

In Step S1803, the agent management unit 308 returns a tenantless code as a response of the HTTP request received in Step S1801. In Step S1804, the agent management unit 308 determines whether an entry (data corresponding to one row) coinciding with the agent ID acquired in Step S1801 is in the agent management table 312. When it is determined that an entry coinciding with the agent ID acquired in Step S1801 is present in the agent management table 312, the process proceeds to a process of Step S1806. When it is not determined that an entry coinciding with the agent ID acquired in Step S1801 is present in the agent management table 312, this means that the agent management unit 308 does not manage the apparatus management agent 104 corresponding to the agent ID. Therefore, in this case, the process proceeds to a process of Step S1805, and the agent management unit 308 returns an agent deletion code as the response of the HTTP request received in Step S1801.

In Step S1806, the agent management unit 308 acquires the authentication key 1103 from the entry coinciding with the agent ID, generates signature information from the acquired authentication key, compares the signature information from the acquired authentication key with signature information acquired from the HTTP header, and determines whether the signature information from the acquired authentication key and the signature information acquired from the HTTP header coincide with each other. When it is determined that the signature information from the acquired authentication key and the signature information acquired from the HTTP header coincide with each other, the process proceeds to a process of Step S1808. When it is not determined that the signature information from the acquired authentication key and the signature information acquired from the HTTP header coincide with each other, this corresponds to an authentication key error. Therefore, in this case, the process proceeds to a process of Step S1807.

In Step S1807, the agent management unit 308 returns an authentication key error code as a response of the HTTP request received in Step S1801. Note that, in the embodiment, when determination results in Steps S1802, S1804, and S1806 are all Yes, a tenantless code, an agent deletion code, and an authentication key error code are returned as notification indicating that authentication errors have occurred.

In Step S1808, the agent management unit 308 acquires the status 1104 from the entry determined as being that coinciding with the agent ID in Step S1804 and determines whether the status 1104 is set to a stop standby. When it is determined that the status 1104 is set to a stop standby, the process proceeds to a process of Step S1809.

In Step S1809, the agent management unit 308 returns a stop code as a response of the HTTP request received in Step S1801. Subsequently, in Step S1810, the agent management unit 308 sets the status 1104 of the entry determined as being that coinciding with the agent ID in Step S1804 to a stopped state.

In Step S1811, the agent management unit 308 determines whether the status 1104 acquired in Step S1808 is restarting. When it is determined that the status 1104 is not restarting, the process proceeds to a process of Step S1814. When it is determined that the status 1104 is restarting, the process proceeds to a process of Step S1812.

In Step S1812, the agent management unit 308 returns a restarting code as a response of the HTTP request received in Step S1801. With regard to the restarting status, a setting in which "data while stopped is sent" or a setting in which "data while stopped is not sent" is made, and other restarting codes are returned in accordance with the settings. In Step S1813, the agent management unit 308 sets the status 1104 of the entry determined as being that coinciding with the agent ID in Step S1804 to running.

Also, in Step S1814, the agent management unit 308 determines that the HTTP request received in Step S1801 has been successfully authenticated and performs a process associated with the HTTP request. Moreover, process success is returned as a response of the HTTP request received in Step S1801.

Figure 19:
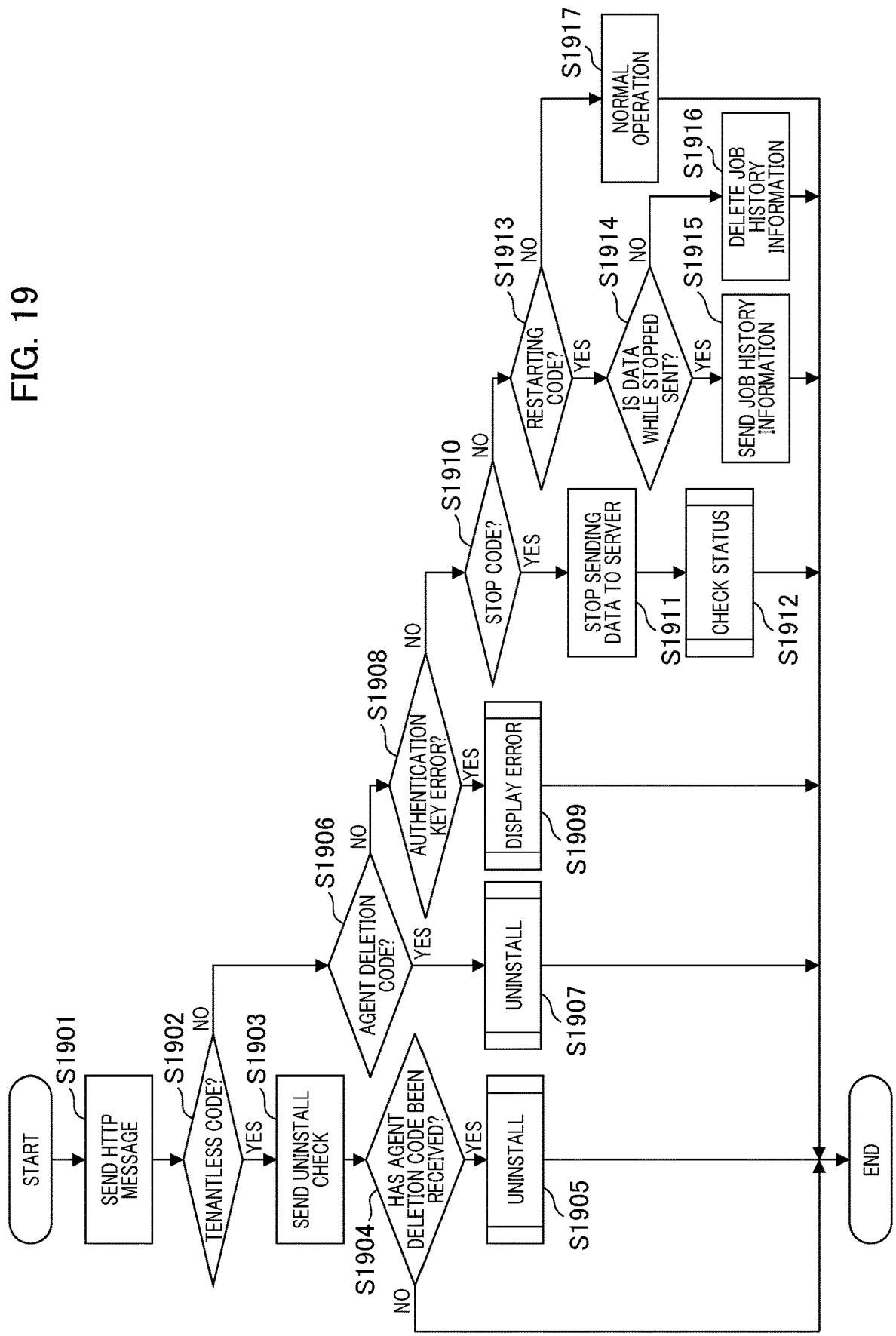
FIG. 19 is a flowchart for describing an example of a process of communicating with an apparatus management server.

FIG. 19 is a diagram for describing an example of a communication process to the apparatus management server of the apparatus management agent.

Step processes in the flowchart shown in FIG. 19 are realized by reading and executing, by the CPU 601 provided in the apparatus management agent 104, the control program stored in the nonvolatile storage means such as the ROM 602 and the HDD 607. Only processes associated with the present invention will be described with reference to this flowchart, and a description of other processes will be omitted because the other processes are different from the essence of the present invention.

In Step S1901, the interface unit 804 sends an HTTP message to the apparatus management server 103. The interface unit 804 acquires an authentication key from the authentication key storing unit 805 when the HTTP message is sent, produces signature information of the HTTP message using the authentication key, and adds the signature information to the HTTP header in addition to a tenant ID and an agent ID. An algorithm such as a secure hash algorithm (SHA) is used as a method of generating the signature information.

In Step S1902, the agent control unit 801 determines whether the response of the HTTP message sent by the interface unit 804 in Step S1901 is a tenantless error serving as one of the authentication errors. When it is determined that the response is not a tenantless error, the process proceeds to a process of Step S1906. When it is determined that the response is a tenantless error, the process proceeds to a process of Step S1903.

In Step S1903, the agent control unit 801 sends an uninstall check request to the apparatus management server 103 via the interface unit 804. When the uninstall check request is sent, the agent control unit 801 acquires an authentication key from the authentication key storing unit 805 and produces signature information of the HTTP message using the authentication key. The agent control unit 801 acquires a tenant ID dedicated for deletion from the authentication key storing unit 805 and adds the tenant ID, the agent ID, and the signature information to an HTTP header.

In Step S1904, the agent control unit 801 determines whether a response of the HTTP message sent by the interface unit 804 in Step S1903 is an agent deletion code. When it is determined that the response is not an agent deletion code, the process ends. When it is determined that the response is an agent deletion code, the process proceeds to a process of Step S1905.

In Step S1905, the deletion processing unit 806 uninstalls the apparatus management agent 104. The uninstalling of the apparatus management agent 104 is uninstalling an agent application installed in the apparatus management agent 104.

In Step S1906, the agent control unit 801 determines whether a response of the HTTP message sent by the interface unit 804 in Step S1901 is an agent deletion code. When it is determined that the response is not a agent deletion code, the process proceeds to a process of Step S1908. When it is determined that the response is an agent deletion code, the process proceeds to a process of Step S1907. Moreover, in Step S1907, the deletion processing unit 806 uninstalls the apparatus management agent 104.

In Step S1908, the agent control unit 801 determines whether a response of the HTTP message sent by the interface unit 804 in Step S1901 is an authentication key error. When it is determined that the response is not an authentication key error, the process proceeds to a process of Step S1910. When it is determined that the response is an authentication key error, the process proceeds to a process of Step S1909.

In Step S1909, the UI control unit 803 controls the display module 606 such that it displays the fact that the authentication key is incorrect to the service provider user. Furthermore, in Step S1910, the agent control unit 801 determines whether a response of the HTTP message sent by the interface unit 804 in Step S1901 is a stop code. When it is determined that the response is not a stop code, the process proceeds to a process of Step S1913. When it is determined that the response is a stop code, the process proceeds to a process of Step S1911.

In Step S1911, the agent control unit 801 stops sending data to the apparatus management server 103. Subsequently, in Step S1912, the agent control unit 801 creates a status check HTTP request for the purpose of checking whether a status of the apparatus management agent 104 has been changed with the apparatus management server 103. Moreover, the interface unit 804 regularly sends the status check HTTP request to the apparatus management server 103.

In Step S1913, the agent control unit 801 determines whether a response of the HTTP message sent by the interface unit 804 in Step S1901 is a restarting code. When it is determined that the response is a restarting code, the process proceeds to a process of Step S1914. When it is determined that the response is not a restarting code and the sending has been successful, the process proceeds to a process of Step S1917.

In Step S1914, it is determined whether a setting in which "data while stopped is sent" has been made with regard to the restarting code. When it is determined that the setting in which "the data while stopped is sent" has not been made, the process proceeds to a process of Step S1916. When it is determined that the setting in which "the data while stopped is sent" has been made, the process proceeds to a process of Step S1915.

In Step S1915, the job history management unit 808 sends job history information collected from the peripheral apparatus 102 to the apparatus management server 103 via the interface unit 804. Furthermore, in Step S1916, the job history management unit 808 deletes the job history information collected from the peripheral apparatus 102. In Step S1917, the apparatus management unit 802 and the agent control unit 801 continuously perform normal operations of the HTTP requests.

Figure 20:
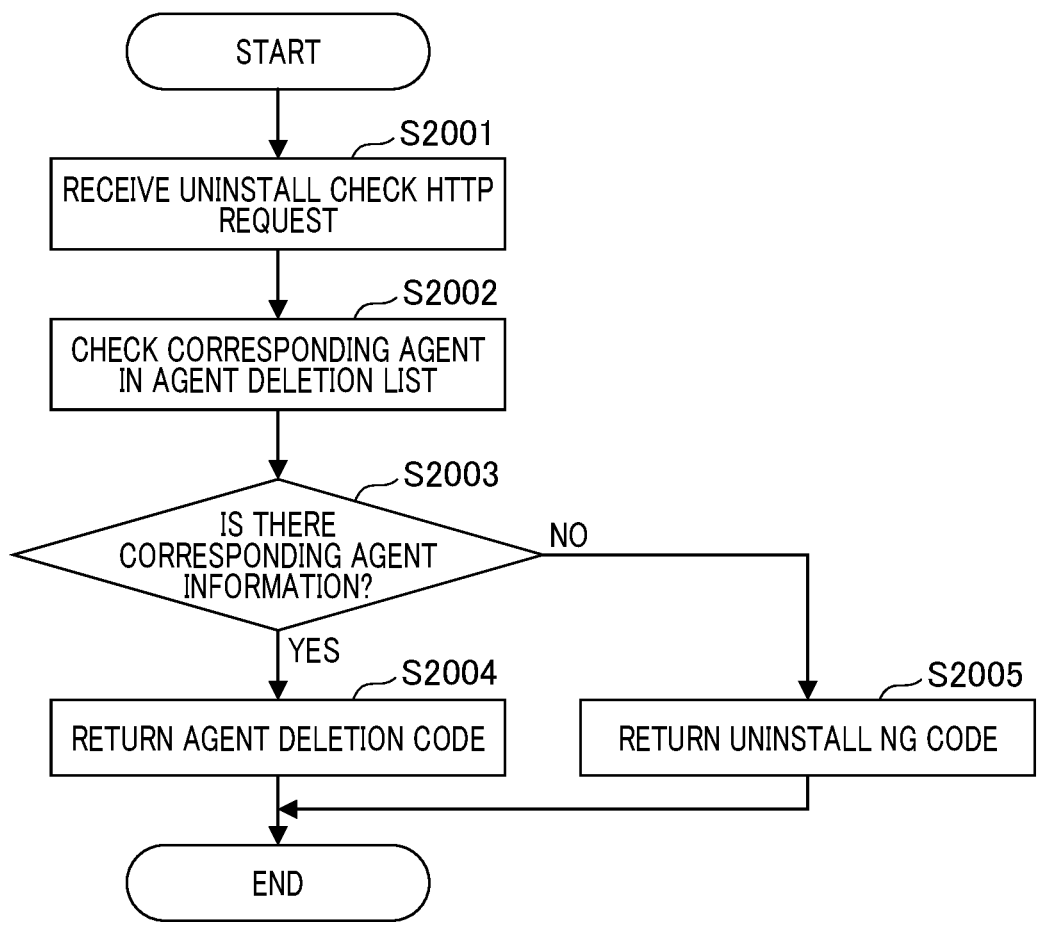
FIG. 20 is a flowchart for describing an operation process when an uninstall check process is received.

FIG. 20 is a flowchart for describing an example of an operation process of the apparatus management server when an uninstall check operation is received.

Step processes in the flowchart shown in FIG. 20 are realized by reading and executing, by the CPU 201 provided in the apparatus management server 103, the control program stored in the nonvolatile storage means such as the ROM 202 and the HDD 207. Only processes associated with the present invention will be described with reference to this flowchart, and a description of other processes will be omitted because the other processes are different from the essence of the present invention.

In Step S2001, the agent management unit 308 receives an uninstall check HTTP request sent from the apparatus management agent 104. An HTTP header of the uninstall check HTTP request includes a tenant ID dedicated for deletion and signature information created using an agent ID and an authentication key of the apparatus management agent 104. The agent management unit 308 performs an agent authentication process using the HTTP message and information of the HTTP header, and the process proceeds to a process of Step S2002 when authentication has been successfully performed. In the agent authentication process, a tenant ID, an agent ID, and signature information are acquired from an HTTP header, and it is regarded that authentication has been successfully performed when a tenant ID dedicated for deletion has been acquired.

Subsequently, in Step S2002, the agent management unit 308 refers to the agent deletion table 314 of a tenant ID designated using the HTTP header and retrieves an entry determined as being that coinciding with the agent ID 1302 stored in the HTTP header. The agent management unit 308 acquires the authentication key 1303 included in the retrieved entry.

In Step S2003, the agent management unit 308 determines whether an apparatus management agent corresponding to the uninstall check HTTP request is in the agent deletion table 314. To be specific, the agent management unit 308 generates signature information of the HTTP message using the authentication key 1303 acquired in Step S2002 and compares the generated signature information with signature information acquired from the HTTP header. When it is determined that the signature information generated using the authentication key 1303 coincides with the signature information acquired from the HTTP header, the agent management unit 308 determines that the apparatus management agent corresponding to the uninstall check HTTP request is in the agent deletion table 314.

When it is determined that the apparatus management agent corresponding to the uninstall check HTTP request is not in the agent deletion table 314, the process proceeds to a process of Step S2005. When it is determined that the apparatus management agent corresponding to the uninstall check HTTP request is in the agent deletion table 314, the process proceeds to a process of Step S2004. In Step S2004, the agent management unit 308 returns an agent deletion code. In other words, the agent management unit 308 sends a deletion code if an agent application, which is a target for an uninstall check requested from the apparatus management agent 104, is a target for uninstalling. Furthermore, in Step S2005, the agent management unit 308 returns an uninstall NG code.

Figure 21:
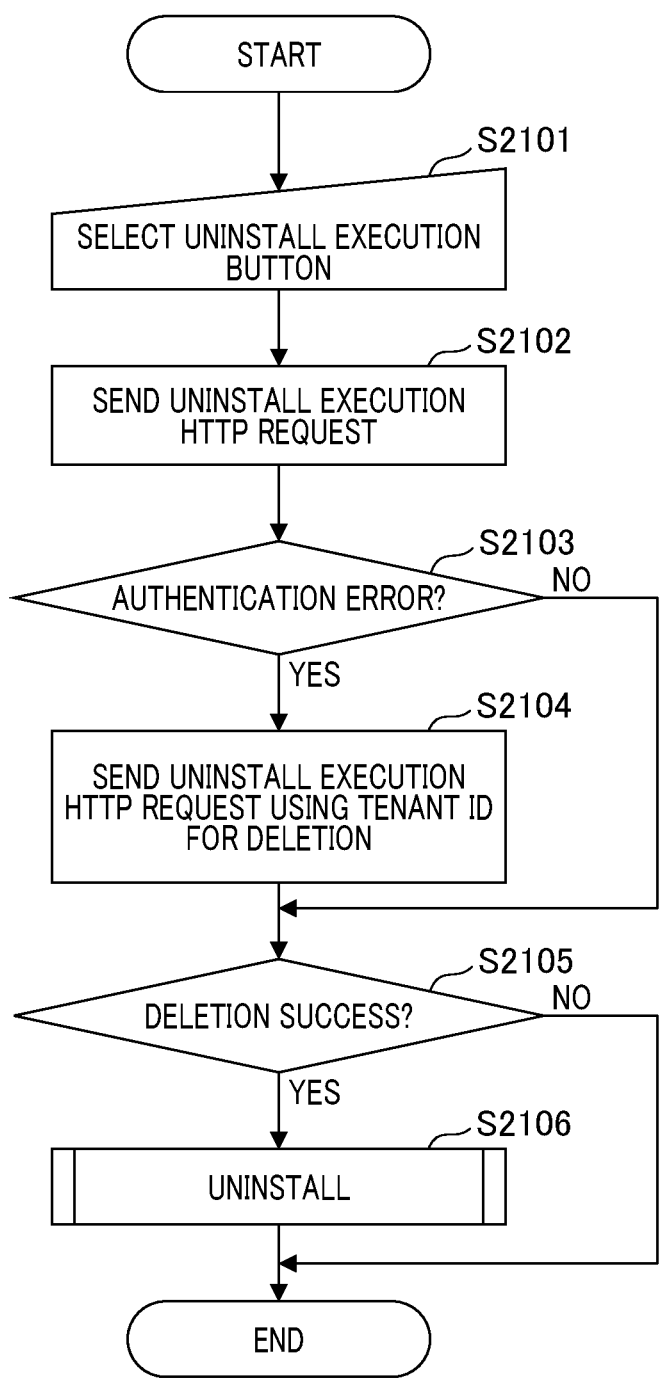
FIG. 21 is a flowchart for describing an uninstall process according to a user's operation.

FIG. 21 is a flowchart for describing an example of an uninstall execution process according to a user's operation.

Step processes in the flowchart shown in FIG. 21 are realized by reading and executing, by the CPU 601 provided in the apparatus management agent 104, the control program stored in the nonvolatile storage means such as the ROM 602 and the HDD 607. Only processes associated with the present invention will be described with reference to this flowchart, and a description of other processes will be omitted because the other processes are different from the essence of the present invention.

In Step S2101, the UI control unit 803 controls the display module 606 and the input apparatus 605 and receives a service provider user's uninstall execution operation from the input apparatus 605. Subsequently, in Step S2102, the interface unit 804 sends an uninstall execution HTTP request to the apparatus management server 103. To be specific, the interface unit 804 acquires an authentication key from the authentication key storing unit 805, generates signature information of the HTTP message using the authentication key, and adds the generated signature information to the HTTP header in addition to the tenant ID and the agent ID.

In Step S2103, the interface unit 804 checks whether a response of the HTTP request sent in Step S2102 is an authentication error. In the embodiment, an authentication error means that a code other than that of process success has been returned. When it is determined that the response is not an authentication error, the process proceeds to a process of Step S2105. When it is determined that the response is an authentication error, the process proceeds to a process of Step S2104.

In Step S2104, the interface unit 804 acquires a tenant ID for deletion from the deletion processing unit 806, creates an uninstall execution HTTP request to which the tenant ID for deletion is given, and sends the created uninstall execution HTTP request to the apparatus management server 103. Subsequently, in Step S2105, the interface unit determines whether deletion success has been returned as a response of Step S2104. When it is determined that deletion success has not been returned, the process ends. When it is determined that deletion success has been returned, the process proceeds to a process of Step S2106. In Step S2106, the deletion processing unit 806 uninstalls the agent application.

Figure 22:
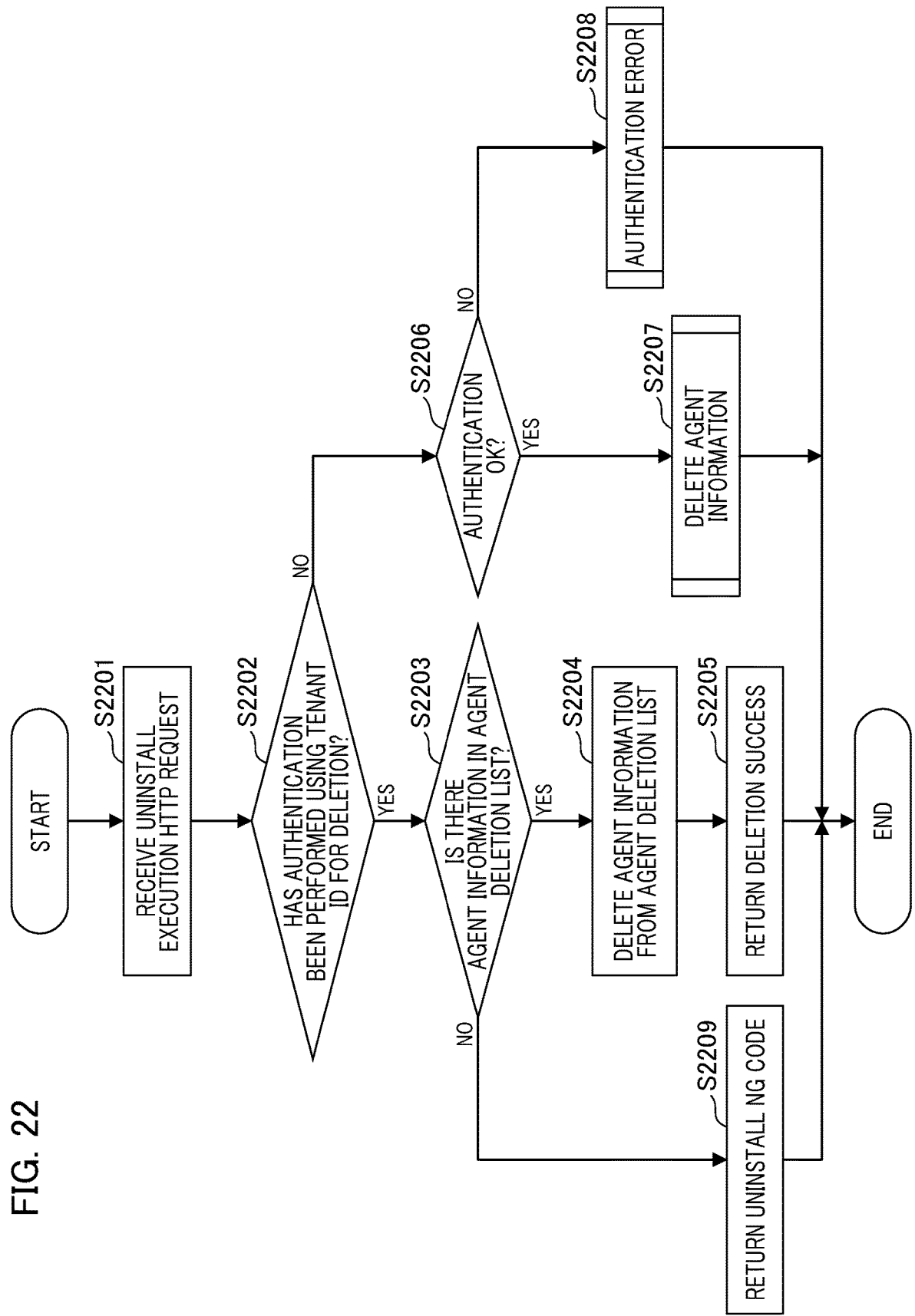
FIG. 22 is a flowchart for describing a process at the time of an uninstall execution request.

FIG. 22 is a flowchart for describing an example of an operation process when the apparatus management server receives an uninstall execution request.

Step processes in the flowchart shown in FIG. 22 are realized by reading and executing, by the CPU 201 provided in the apparatus management server 103, the control program stored in the nonvolatile storage means such as the ROM 202 and the HDD 207. Only processes associated with the present invention will be described with reference to this flowchart, and a description of other processes will be omitted because the other processes are different from the essence of the present invention.

In Step S2201, the agent management unit 308 receives an uninstall execution HTTP request sent from the apparatus management agent 104. In Step S2202, the agent management unit 308 performs an agent authentication process using of an HTTP message and information of an HTTP header and determines whether authentication has been successfully performed using a tenant ID dedicated for deletion. When it is determined that the authentication has not been successfully performed using the tenant ID dedicated for deletion, that is, when a tenant ID designated using an HTTP header is a normal tenant ID, the process proceeds to a process of Step S2206. When it is determined that the authentication has been successfully performed using the tenant ID dedicated for deletion, the process proceeds to a process of Step S2203.

In Step S2203, the agent management unit 308 determines whether agent information is in an agent deletion list. To be specific, the agent management unit 308 refers to the agent deletion table 314 corresponding to the tenant ID designated using the HTTP header. The agent management unit 308 retrieves an entry determined as being that coinciding with the agent ID 1302 designated using the HTTP header and acquires the authentication key 1303 of the entry. The agent management unit 308 produces signature information of the HTTP message using the authentication key 1303 of the entry and compares the produced signature information with signature information acquired from the HTTP header. When it is determined that the signature information produced using the authentication key 1303 does not coincide with the signature information acquired from the HTTP header, the agent management unit 308 determines that the agent information is in the agent deletion list. When it is determined that the signature information produced using the authentication key 1303 coincides with the signature information acquired from the HTTP header, the agent management unit 308 determines that the agent information is not in the agent deletion list. When it is determined that the agent information is in the agent deletion list, the process proceeds to a process of Step S2204. When it is determined that the agent information is not in the agent deletion list, the process proceeds to a process of Step S2209. In Step S2209, the agent management unit 308 returns an uninstall NG code as a response of the HTTP request received in Step S2201.

In Step S2204, the agent management unit 308 deletes agent information of the entry determined as being that coinciding with the signature information acquired from the HTTP header in Step S2203 from the agent deletion table 314. Moreover, in Step S2205, the agent management unit 308 returns deletion success as a response of the HTTP request received in Step S2201.

Also, in Step S2206, the agent management unit 308 performs an authentication process on the basis of the agent ID 1102 acquired from the agent management table 312 corresponding to the tenant ID designated using the HTTP header and determines whether authentication has been successfully performed. To be specific, the agent management unit 308 acquires the authentication key 1103 corresponding to the agent ID 1102, produces signature information using the authentication key 1103, and compares the produced signature information with signature information acquired from the HTTP header. When it is determined that the signature information produced using the authentication key 1103 coincides with the signature information acquired from the HTTP header, the agent management unit 308 determines that the authentication has been successfully performed. When it is determined that the authentication has been successfully performed, the process proceeds to a process of Step S2207. When it is determined that the authentication has failed, the process proceeds to a process of Step S2208.

In Step S2208, the agent management unit 308 deletes information associated with the agent ID acquired from the tables. Furthermore, in Step S2209, the agent management unit 308 returns an authentication error as a response of the HTTP request received in Step S2201. The authentication errors indicate codes of Steps S1803, S1805, and S1807. According to the system in the embodiment, an apparatus management agent can be automatically stopped and deleted, and thus it is possible to reduce unnecessary communication.

(Other Embodiments)

Embodiment(s) of the present invention can also be realized by a computer of a system or apparatus that reads out and executes computer executable instructions (e.g., one or more programs) recorded on a storage medium (which may also be referred to more fully as a "non-transitory computer-readable storage medium'") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory apparatus, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-179327, filed Sep. 14, 2016, which is hereby incorporated by reference wherein in its entirety.

What is claimed is:

1. An information processing system comprising: a management system and a client apparatus in which an agent application controlling communication with the management system is installed,
wherein the client apparatus comprises a first memory storing instructions and a first processor which is capable of executing the instructions in the first memory causing the client apparatus to:
perform communication with the management system, wherein the communication includes an agent ID of the agent application installed in the client apparatus,
wherein the management system comprises a second memory storing instructions and a second processor which is capable of executing the instructions in the second memory causing the management system to:
manage management information related to the client apparatus in association with the agent ID of the agent application, wherein the management information includes a status of the agent application, and
send, if the status corresponding to the agent ID included in the communication received from the client apparatus changes to restarting, a restarting code causing the client apparatus to restart the communication with the management system, wherein the restarting code includes a setting indicating whether data, while the status of the agent application is stopped, is sent to the management system, and
wherein the instructions in the first memory further cause the client apparatus to:
receive the restarting code from the management system, and
perform communication with the management system in accordance with the restarting code and the setting.

2. The information processing system according to claim 1,
wherein the instructions in the first memory further cause the client apparatus to:
send an uninstall check request for the agent application if there is an authentication error in communication with the management system, and
uninstall the agent application if a deletion code is received from the management system,
wherein the instructions in the second memory further cause the management system to:
send the deletion code if the client apparatus which has sent the uninstall check request is registered as a target for uninstalling the agent application, and
send the deletion code to the client apparatus if an agent ID included in communication received from the client apparatus is not managed using the management information.

3. The information processing system according to claim 1,
wherein the instructions in the second memory further cause the management system to:
manage customer information including at least contract information in association with a tenant ID uniquely identifying a tenant of a customer, wherein the management information is further associated with the tenant ID,
provide notification to an administrator apparatus if an access to the management system is not performed after a contact period indicated by the customer information is completed, and
after the notification is provided to the administrator apparatus, set the status associated with the tenant ID included in the customer information to be stop standby.

4. The information processing system according to claim 3, wherein the instructions in the second memory further cause the management system to register the client apparatus corresponding to the management information associated with the tenant ID of the tenant in information to be deleted as a target for uninstalling the agent apparatus if a deletion request of a tenant of the customer is received.

5. The information processing system according to claim 4, wherein the instructions in the second memory further cause the management system to send a deletion code if the client apparatus which has sent an uninstall check request is registered in the information to be deleted.

6. The information processing system according to claim 5,
wherein the instructions in the first memory further cause the client apparatus to:
send an uninstall request of the agent application if the client apparatus is instructed to uninstall the agent application, and
uninstall the agent application if information indicating that the information related to the client apparatus has been deleted from the management system is received, and
wherein the instructions in the second memory further cause the management system to:
delete the information related to the client apparatus from the information to be deleted in accordance with the uninstall request of the agent application, and send the information indicating that the information related to the client apparatus has been deleted to the client apparatus.

7. A method for controlling an image processing system that includes a management system and a client apparatus in which an agent application controlling communication with the management system is installed, the method comprising:

performing, by the client apparatus, communication with the management system, wherein the communication includes an agent ID of the agent application installed in the client apparatus;

managing, by the management system, management information related to the client apparatus in association with the agent ID of the agent application, wherein the management information includes a status of the agent application;

sending, if the status corresponding to the agent ID included in the communication received from the client apparatus changes to restarting, a restarting code causing the client apparatus to restart the communication with the management system, wherein the restarting code includes a setting indicating whether data, while the status of the agent application is stopped, is sent to the management system;

receiving, by the client apparatus, the restarting code from the management system; and performing communication, by the client apparatus, with the management system in accordance with the restarting code and the setting.

* * * * *